April 6, 1965 R. E. STOBBE ETAL 3,176,530
AUTO-CYCLE CONTROL SYSTEM
Filed July 28, 1960 5 Sheets-Sheet 1

INVENTORS
Richard E. Stobbe
Frank Zankl
BY William C. Gleisner Jr.
Attorney

April 6, 1965 R. E. STOBBE ETAL 3,176,530
AUTO-CYCLE CONTROL SYSTEM
Filed July 28, 1960 5 Sheets-Sheet 2
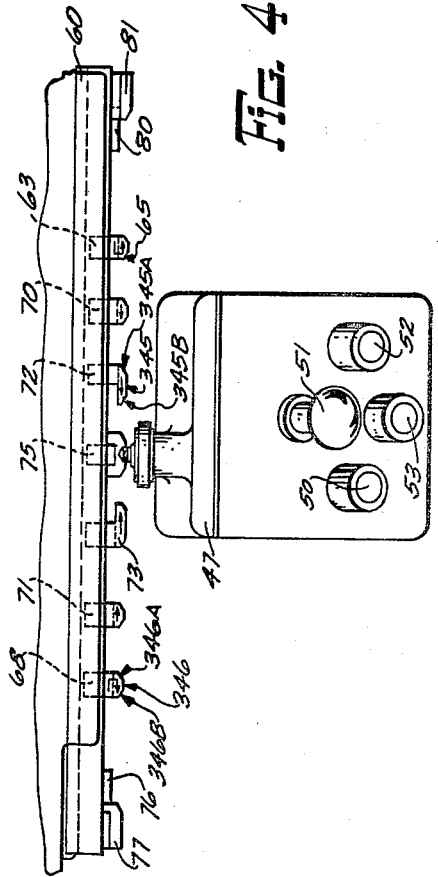
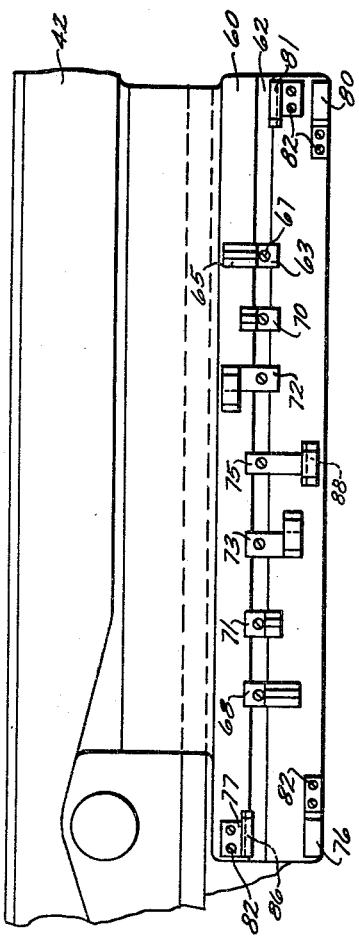
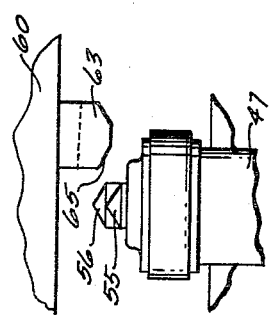
INVENTORS
Richard E. Stobbe
Frank Zanki
BY William C. ...
Attorneys

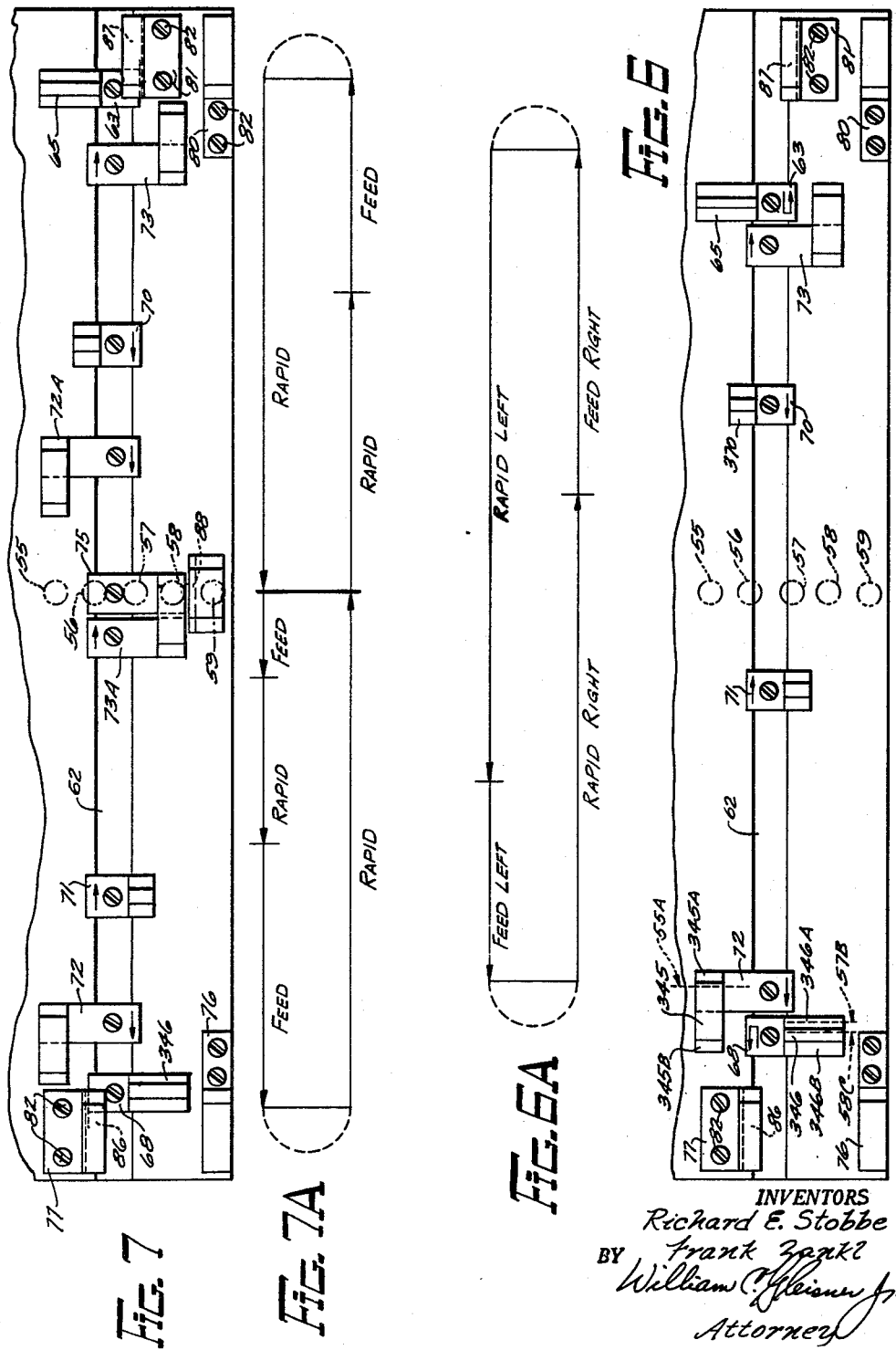

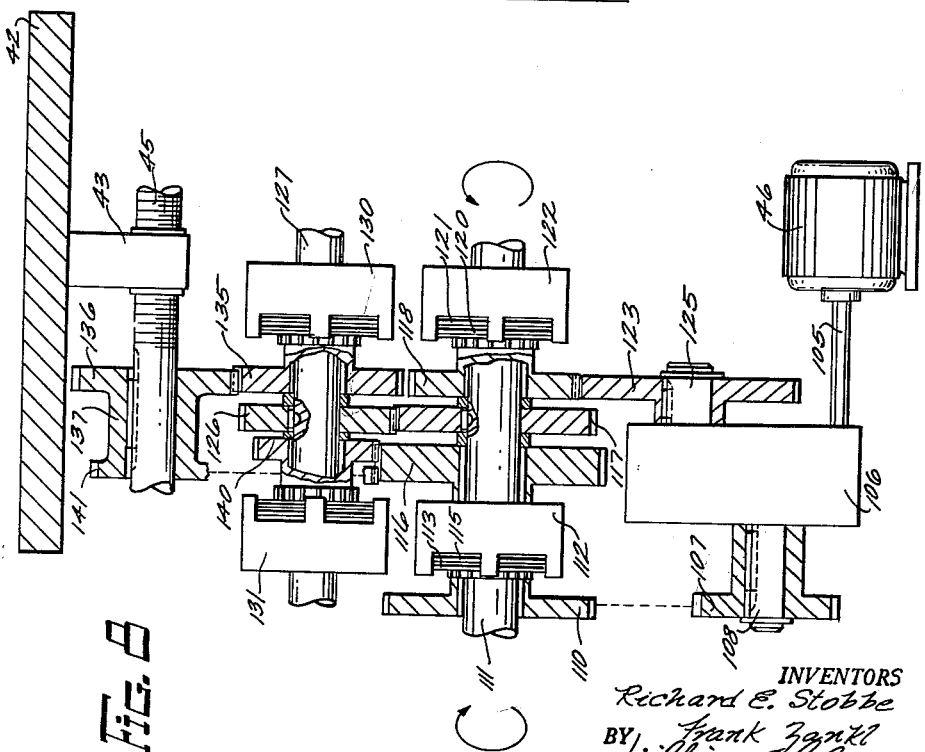

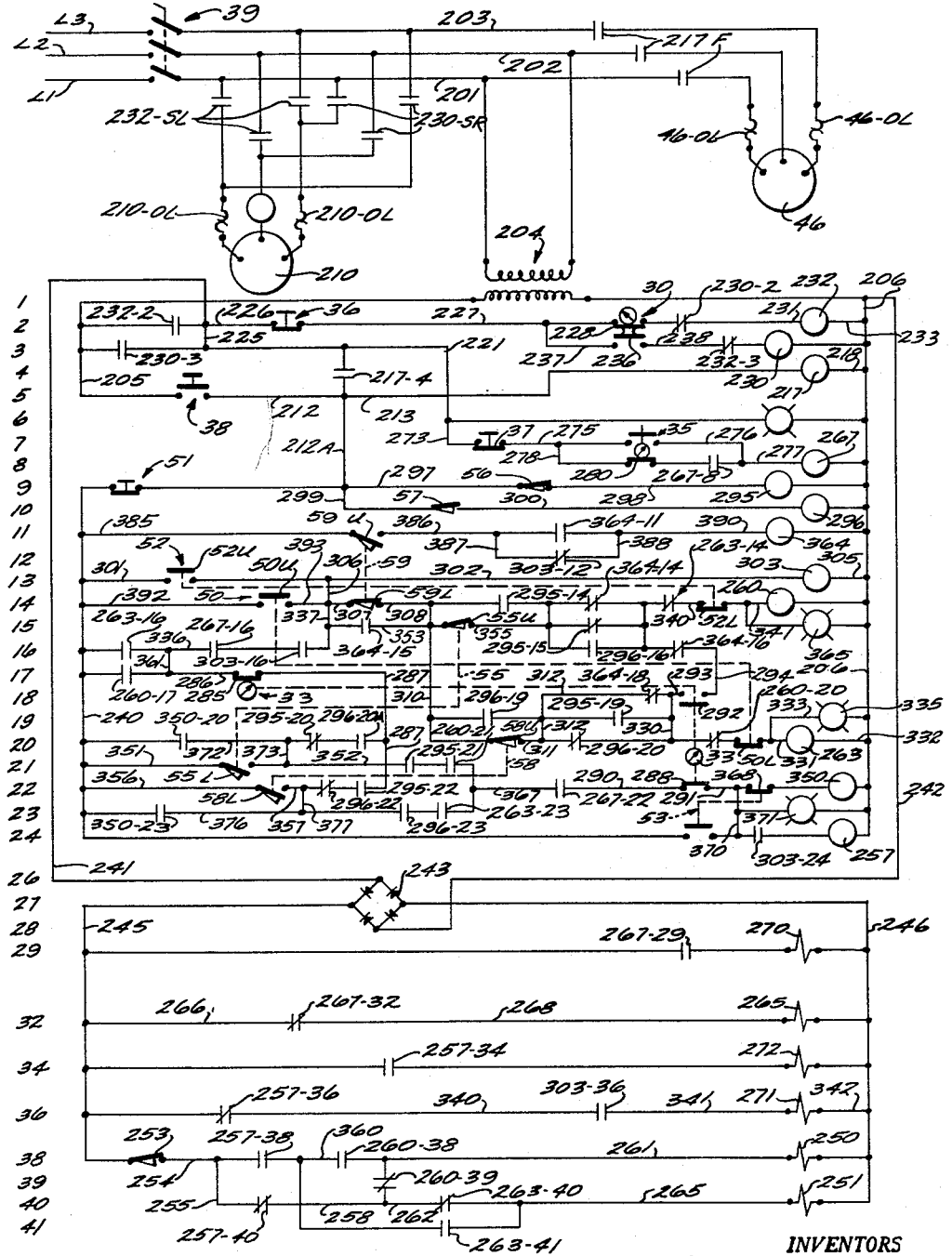

United States Patent Office 3,176,530
Patented Apr. 6, 1965

3,176,530
AUTO-CYCLE CONTROL SYSTEM
Richard E. Stobbe, West Allis, and Frank Zankl, Milwaukee, Wis., assignors to Kearney & Trecker Corporation, West Allis, Wis., a corporation of Wisconsin
Filed July 28, 1960, Ser. No. 45,913
14 Claims. (Cl. 74—365)

This invention relates to automatic control systems for machine tools and more particularly to a control system for effecting either continuous or intermittent automatic cycling operation of a movable work supporting element in a machine tool.

A general object of this invention is to provide a greatly improved automatic cycle control system for a machine tool that is operative to effect either continuous or intermittent cyclic displacement of a power driven work supporting member of a machine tool.

Another object of the invention is to provide an improved dog actuated automatic control system operative to stop movement of a worktable at any predetermined position, being selectively preset to immediately reinstate worktable movement in either direction of travel at either a feed or rapid traverse rate of movement.

Another object of the invention is to provide a control system operative to utilize the full length of travel of the work supporting member.

Another object of the invention is to provide an automatic control system wherein the reliability of the stop function of the system is increased by the fact that its function is not shared with any other function of movement.

Another object of the invention is to provide an automatic control system providing rapid rate displacement of the work support after a dynamic stop function, without an intervening feed rate of travel.

Another object of the invention is to provide a control system for automatic or intermittent cycling operation employing dogs of simplified configuration for actuating switches.

Another object of this invention is to provide a control system having control switches provided with actuating plungers of different lengths to provide sequential switch actuation upon engagement with a single cam face presented by a single coded function change dog.

Another object of the invention is to provide a control system with a single, uncoded center stop dog disposed to coact with a single stop switch.

Another object of this invention is to provide a control system having zero length of feed travel in moving from a center stop function at rapid rate of travel in a preselected direction.

Another object of this invention is to provide an improved automatic control system for controlling a reciprocal power driven work support by means of both coded and uncoded function change dogs, coacting with associated coded and uncoded function change switches.

A still further object of this invention is to provide an automatic control system with a pair of code actuated switches having plungers of different lengths, disposed to produce a cam actuating effect when such switches are engaged by the same dog.

According to this invention, there is provided an improved automatic control apparatus to control the displacement of a power driven reciprocably movable work support of a machine tool. The control apparatus is provided with five switches positioned in operative proximity to the worktable to be actuated by one or another of a plurality of dogs adjustably secured to the worktable. One of the switches is operative to stop table movement, irrespective of the direction of movement. The four other switches and coded combination thereof are directionally sensitive; i.e., two of the switches operate to produce selected changes in function when the table is moved in one direction, and the other two switches effect a change in function when the table is moved in the opposite direction. Thus, although the dogs engage the switches in either direction of movement of the worktable, a change in function is effected only when switches identified with that direction of movement are actuated. The five switches constitute signal means and the switch actuating dogs constitute signal actuating means, the coaction therebetween operating to initiate changes in function of the movable worktable. A pair of power driven reversing clutches are operatively connected to effect worktable movement in either direction and are also positionable in a neutral position. For controlling the rate of table movement, a pair of power driven rate change clutches are respectively connected to drive the directional clutches.

The five switches have individual functions respectively of feed left, feed right, rapid traverse left, rapid traverse right, and stop. Reversing functions are effected by actuation of a coded combination of the two switches associated with each direction of movement, and end limit stop functions and center stop functions are effected by the stop switch.

Selective momentary actuation of the switches by the dogs establishes electrical connections for corresponding actuation of the clutches for automatically moving the worktable in either direction of travel and at either rate of travel. Momentary actuation of the stop switch automatically interrupts the electrical connections thereby causing the power driven worktable to stop.

The foregoing and other objects of the invention which will become more fully apparent from the following description of the automatic control apparatus may be achieved by the embodying mechanism described herein in connection with the accompanying drawings, in which:

FIG. 3 is a fragmentary view in front elevation of the worktable showing the various types of dogs secured thereto;

FIGURE 4 is a fragmentary top view of the worktable and control post illustrating the operative cooperation between the dogs and switches actuated by them contained within the control post;

FIG. 5 is an enlarged fragmentary top view of portions of the worktable and control post illustrating the difference in length of the actuating plungers for the coded switches;

FIG. 6 is a diagrammatic fragmentary view in front elevation of the worktable illustrating an arrangement of dogs for a particular continuous cycle of automatic operation in addition to direction indicia markings on the dogs;

FIG. 6A is a line diagram illustrating the various movements of the worktable effected by the dogs positioned as shown in FIG. 6;

FIG. 7 is a fragmentary view of the worktable illustrating trip dogs positioned for an automatic split-cycle of operation;

FIG. 7A is a line diagram showing a split-cycle of worktable movements effected by the dogs secured to the worktable as shown in FIG. 7;

FIG. 8 is a diagrammatic view showing the drive mechanism for the worktable;

FIG. 9 is a chart indicating the switch or combination of switches contained within the control post and actuated by the various dogs to obtain a desired movement of the worktable;

FIG. 10 is a schematic circuit diagram of the automatic electrical control system as well as circuitry for energizing the several motors associated therewith.

Figure 1:
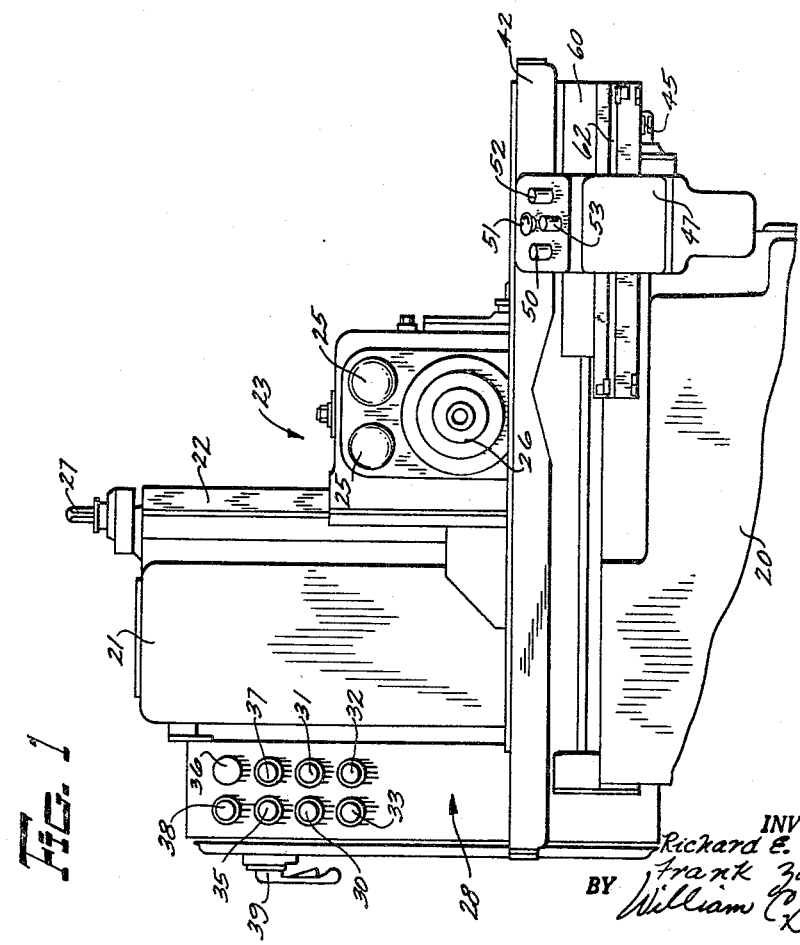
FIGURE 1 is a general view in front elevation of a machine tool embodying the present invention.

Referring to the drawings and specifically to FIG. 1, the machine tool comprises a base 20 having a hollow column 21 rising vertically therefrom. The column 21 is provided with vertical way surfaces 22 disposed in well known manner to slidably support a spindle head 23 for vertical movement. The spindle head is provided with overarms 25 and a rotatably journalled tool carrying spindle 26. The spindle head 23 is moved vertically manually by applying a hand crank (not shown) to the extending end of an elevating screw 27 which cooperates with a nut (not shown) carried by the spindle head. At the left side of the column 21 there is provided a control box 28 which contains the various elements of the electrical control circuit to be subsequently described; and which also supports rotary switches 30, 31, 32, 33 and 35; as well as push button switches 36, 37 and 38, all forming a part of the electrical control circuit. In addition, the control box 28 contains a main disconnect switch 39, the handle of which extends from the control box 28.

Figure 2:
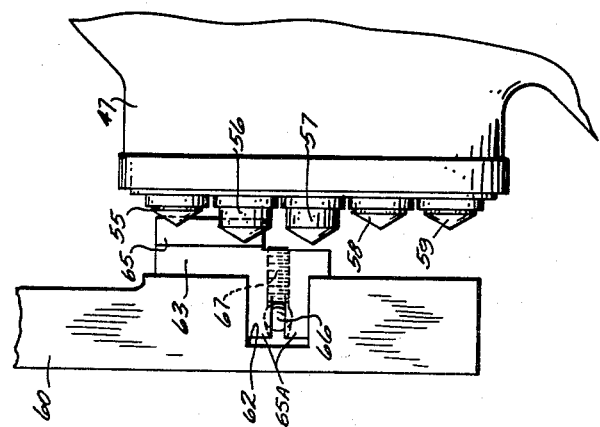
FIG. 2 is a fragmentary view in side elevation of the control post and the associated dog support plate illustrating switch actuating plungers having different lengths.

Forwardly from the column 21, the upper surface of the base 20 is provided with way surfaces for slidably securing a reciprocable worktable 42 in operative proximity to the rotatable spindle 26 carried by the spindle head 23. The worktable 42 is power driven by a cooperating nut 43 and screw 45, shown in FIG. 8, operatively interconnected between the worktable 42 and a feed motor 46 by means of appropriate gearing to be described. The worktable 42 may be moved manually by applying a hand crank (not shown) to one end of the screw 45 extending outwardly below the table 42. At the upper right end of the base 20, there is secured to the base a unitary control post 47 disposed to support manually operated push button switches 50, 51, 52 and 53, and dog actuated limit switches or plunger switches 55, 56, 57, 58 and 59, as best shown in FIGS. 1 and 2. Although the reference numerals 55 to 59 inclusive are associated with the outwardly biased actuating plungers for corresponding separate switches carried within the control post, these numerals are used to designate the complete switches, including the plunger, for simplicity in the description. The control post 47 is secured to the base 20 in a manner that the switches 55 through 59, inclusive, are in stationary vertical alignment in operative proximity relative to a plurality of adjustable dogs and non-adjustable dogs fixedly carried by a forward depending portion 60 of the longitudinally movable worktable 42, as shown in FIGS. 2, 4 and 5. Thus, as the table 42 is moved, the various dog signal actuating means are moved relative to the control post 47 to selectively engage one or another, or a combination of the switches 55 through 59, inclusive.

The plunger switches 55 through 59, inclusive, have a normal position and an actuated or depressed position and are interconnected in an electrical control circuit, shown in FIG. 10, which will be subsequently described, to constitute signal means for initiating a selected change in machine function. The associated electrical control circuit is so arranged as to render each of the plunger switches 55, 56, 57 and 58 direction sensitive to exercise a particular influence on the electrical control circuit. In this respect, when the worktable 42 is moving leftwardly actuation of plunger switches 55 and 56, either individually or in combination, effect a desired change in machine function. Conversely, even though switches 55 and 56 are dog actuated during rightward table movement, no function changes are effected. In similar manner, actuation of the plunger switches 57 and 58 is operative to effect a function change during rightward table movement, but is not operative to effect a function change during leftward table movement. The plunger switch 59 is not direction sensitive and will stop displacement of the worktable whenever actuated regardless of the direction of movement of the worktable. The various machine functions initiated by individual or coded dog actuation of one or another of the switches 55 to 59 inclusive are represented in the chart, FIG. 9, together with appropriate legends. As indicated in FIG. 9, left feed and left rapid functions are initiated by switches 55 and 56 respectively; right feed and right rapid functions by switches 57 and 58.

The depending portion 60 of the worktable 42 is provided with a single, longitudinally extending groove or slot 62 facing the control post 47 and adapted to carry the various adjustable dogs past the plunger switches 55 to 59, inclusive, to actuate them.

As shown in FIG. 2, a reverse dog 63 having a switch engaging portion 65 extending outwardly from the front face of the table 42 is securely held in the groove 62 by an expansible portion 65A. Releasable clamping is effected by means of a ball 66 seated in a recess in the rearward portion 65A of the dog and adapted to urge the two legs comprising the portion 65A laterally outward when the ball is moved leftwardly by a screw 67. Thus, the upper and lower faces of the expansible rearward dog portion 65A are urged into tight frictional engagement with the corresponding horizontal faces of the slot 62 to securely clamp the dog 63 to the table. The various shapes of the adjustable dogs and the non-adjustable dogs used to actuate the plunger switches 55 to 59, inclusive, are shown in FIGS. 3, 4, 6 and 7. It is to be understood that each of the dogs shown in the drawings is provided with angular cam faces in a manner to effect gradual inward movement of an associated actuating plunger for the switches, in either direction of movement. FIGS. 3 and 4 illustrate the dogs required to actuate the plunger switches 55 to 59, inclusive, to effect the various function changes indicated in the chart, FIG. 9.

FIGS. 6 and 7 illustrate particular predetermined automatic cycles of operation; FIG. 7 being a dual cycle with a dynamic center stop and FIG. 6 being a single continuous cycle of operation. During automatic mode, a continuous automatic cycle of table movements, as illustrated in FIGS. 6 and 6A, is initiated by momentarily depressing the table start button switch. The adjustable dogs shown in FIGS. 3 and 4 are each secured within the groove 62 in a manner identical to that shown and described for the reverse dog 63. As shown in FIG. 3, the reverse dog 63 is so positioned with respect to the slot 62 as to engage the plunger switches 55 and 56. A second reverse dog 68, configured identically to the reverse dog 63, is positioned in the groove 62 in opposite fashion to engage plunger switches 57 and 58. Dogs 70 and 71, termed feed dogs, are of like configuration and positioned in the groove 62 in opposite manner to respectively engage plunger switches 56 and 57. Rapid traverse dogs 72 and 73 are likewise of identical configuration and positioned to extend in opposite directions from the slot to respectively engage plunger switches 55 and 58. An adjustable stop dog 75 is positioned in the groove 62 to engage the plunger switch 59 for effecting an immediate dynamic stop function of the worktable. At opposite ends of the depending portion 60, positive right limit stop dogs 76, 77 and left limit stop dogs 80, 81 are secured by means of cap screws 82 to limit the allowable range of table movement in either direction. The fixed dogs 76 and 80 will engage the plunger switch 59 thereby stopping worktable movement in a rightward or leftward direction, respectively. The fixed dogs 77 or 81 actuate the plunger switches 56 or 57 respectively to preclude continued worktable movement in a rightward or leftward direction. Actuation of the plunger switch 59 by either fixed dog 76 or 80 stops table movement, and the fixed dogs 77 and 81 actually constitute a safety feature to prevent manually initiated restarting of the table in a rightward or leftward direction beyond the end limit stops 76 or 80. For example, assume the worktable 42 has been moved to the right limit stop position wherein the fixed dog 76 actuates plunger switch 59 and the fixed dog 77 actuates the plunger switch 56. Engagement of the dog 76 with the plunger switch 59 effects the actual stopping of the worktable 42 and engagement of the dog 77 with the plunger switch 56 conditions the electrical circuit to prevent further rightward movement of the worktable under power means, either automatically or manually. The fixed dogs 80 and 81 perform like functions when the worktable 42 is moved to the left end limit, the only difference being that fixed stop dog 81 actuates plunger switch 57 thereby preventing further leftward movement of the worktable under power means.

In order to render available the full length of travel of the worktable in automatic mode of operation, the dogs 77 and 81 are provided with slots or grooves 86 and 87, respectively, to permit the reverse dogs 68 and 63 to be secured in the groove 62 in overlapping relationship with the dogs 77 and 81, as shown in FIG. 7. In this manner the reverse dogs 68 or 63 can be positioned to effect a reversal of the direction of worktable movement just prior to having the end limit dogs 76 or 80 stop worktable movement. Similarly, the stop dog 75 is provided with a slot or groove 88 to permit the dog 75 to be positioned in overlapping relationship with either of the limit dogs 76 or 80. By being able to position the stop dog 75 in this manner, it will be apparent that a greater length of travel of the worktable is usable in conjunction with the dog 75. In addition, it will be noted that the limit dogs 76 and 80 can be used to stop worktable movement when it is desired to use the maximum length of worktable travel with a stop function at either end.

To obtain proper coded switch actuation of a plurality of switches in a predetermined cycle of operation, it is necessary to sequentially actuate a code actuated pair of the plunger switches 55 to 58 inclusive, by means of a single dog. To simplify dog configuration, a cam effect for sequentially actuating the plunger switches 55 to 59, inclusive, is effected by extending several of the plunger switches outwardly from the control post 47 a greater distance than the remainder of the switches. Thus, the one continuous angular cam face of the reverse dog coacts with the two plungers and of slightly different length to provide the necessary sequential actuation. Referring specifically to FIGS. 2 and 5, it will be noted that the plunger switches 56 and 57 extend leftwardly from the control post 47 and are in closer proximity to the depending portion 60 of the worktable 42 than the plunger switches 55, 58 and 59. By so locating the plunger switches 55 to 59 inclusive, with respect to each other, a cam effect is obtained when a dog engaging more than one plunger switch is moved into engaging position with plunger switches having different lengths.

For example, as illustrated in FIGS. 2 and 5, as the reverse dog 63, which is provided with an operative, vertically disposed angular cam face of length sufficient to engage both plungers 55 and 56, moves into engaging position with the plungers, it will first engage the longer plunger 56, and then the short plunger 55. Actuation of the plunger switch 56 will, of course, condition the electrical circuit, FIG. 10, in a predetermined manner, assuming the worktable is moving in the proper leftward direction so that the plunger switches 55 and 56 are operably responsive to actuation. The subsequent actuation of the short plunger switch 55 thereby conditions the electrical circuit, FIG. 10, to another predetermined condition for effecting reversed movement in a rightward direction. It is to be understood that the cam effect obtained by providing different lengths of actuating plungers for certain of the switches 55 to 59, inclusive, may be utilized with equal facility for effecting sequential actuation of a plurality of different switches.

The drive for the worktable 42 is schematically shown in FIG. 8. As there shown, the motor 46 is operatively connected to rotate a power input shaft 105 operatively connected to drive a transmission 106, of any well known adjustable speed type. A feed drive gear 107 is keyed to a power output shaft 108 of the transmission 106 and meshes with a gear 110 independently rotatable on a rate change shaft 111. An electromagnetic clutch 112 is selectively energizable to urge clutch plates 113, secured to one end of the hub of the gear 110 into engagement with clutch plates 115 secured to the clutch 112.

The shaft 111 rotatably supports an idler gear 116, a gear 117 keyed to the shaft, and a rapid traverse drive gear 118 independently rotatable about the shaft, and having clutch plates 120 secured to the hub of the gear 118 and engageable with clutch plates 121 secured to an electromagnetic clutch 122. The rapid traverse gear 118 is driven by a gear 123 which is keyed to a counterclockwise rotating power output shaft 125 of the transmission 106. Both of the clutches 112 and 122 are carried by the shaft 111 and keyed thereto, the clutch 112 being used to move the worktable 42 at a selected feed rate and the clutch 122 being used for moving the table at a rapid traverse rate. Hence the clutch 112 is a feed clutch and the clutch 122 is a rapid traverse clutch. It will be noted that the rapid traverse input gear 118 is normally rotating in a counterclockwise direction and that the feed input gear 110 is normally rotating in a clockwise direction. Due to the reversed rotation of the gears 118 and 110, respectively, selective engagement of the rapid traverse clutch 122 or the feed clutch 112 effects not only a change in the rate of rotation of the shaft 111, but also a change in the direction of rotation. Thus, engagament of clutch 122 effects counterclockwise rotation of the shaft 111, and engagement of clutch 112 effects clockwise rotation of the shaft 111. It will be apparent that one of the clutches must be disengaged when the other clutch is engaged in order to effect rotation of the shaft 111. Therefore, although the rapid traverse clutch 122 and the feed clutch 112 are considered primarily as rate change clutches, they function also as directional clutches in coordinated relationship with primary directional clutches to be subsequently described.

Power from the shaft 111 is transmitted by means of the gear 117 keyed thereto to a gear 126 keyed to the central portion of a primary directional shaft 127. It will be apparent that whenever the gear 117 is rotating in a clockwise direction at a feed rate, the primary directional shaft 127 will be rotated in a counterclockwise direction. In a similar manner, whenever the gear 117 is being driven in a counterclockwise direction at a rapid traverse rate, the primary directional shaft 127 will be rotated at a rapid rate in a clockwise direction. Irrespective of the direction of rotation of the primary directional shaft 127, power is transmitted to move the worktable 42 in a selected direction at the required rate, by means of a pair of electromagnetic directional clutches 130 and 131, having their driving output members respectively keyed to the shaft 127. Actuation of the clutch 130 effects a driving connection from the primary directional shaft 127 by engagement of cooperating clutch plates to drive a gear 135 that is rotatably carried on an intermediate portion of the shaft 127. The gear 135 meshes with a gear 136 forming part of a two gear couplet 37 that is keyed to the table feed screw 45. Likewise, actuation of clutch 131 effects a driving connection from the primary directional shaft 127 by the engagement of cooperating clutch plates to drive a gear 140 rotatably carried on an intermediate portion of the shaft 127. The gear 140 engages the idler gear 116 journalled on the shaft 111 which in turn engages a gear 141 of the gear couplet 137. Thus, actuation of either clutch 130 or clutch 131 will transmit power to the gear couplet 137 to rotate the feed screw 45 for effecting selective longitudinal displacement of the worktable. It will be apparent, that in order to transmit power from the primary directional shaft 127 to the gear couplet 137, one of the clutches 130 and 131 must be disengaged while the other clutch is engaged.

The various clutches that are engaged for effecting a particular rate and direction of table movement are indicated in the chart, FIG. 9. Dynamic, positive stopping of table movement is effected by simultaneously disengaging rate change clutches 112, 122 and engaging reverse clutches 130, 131. Thus, whenever the machine is electrically activated prior to starting a machine cycle, reverse clutches 130, 131 are both engaged. To initiate movement in either direction, therefore, it is necessary to disengage one of the reverse clutches, 130 or 131, and engage one of the rate change clutches 112 or 122.

The electrical control circuit for energizing a spindle motor 210, the feed motor 46, the automatic electrical control circuit, and the associated electromagnetic clutches is illustrated in FIG. 10. To simplify the reading of the electrical circuit and for locating particular components, FIG. 10 is provided with a vertical column of numerals at the left of the drawing that represent a key for the horizontal lines in the circuit. In applying the key to the circuit, the contact bars of the various relays are provided with a hyphenated number. The first part of the hyphenated number represents the relay coil and the second part of the number, e.g., the numeral after the hyphen, represents the location of an associated contact bar in the circuit. In the event that more than one contact bar of the same relay appears in the same horizontal line, the second and third contact bars are given letter designations, such as A, B, etc. The second part of the hyphenated number will aid in finding the particular contact when reading the specification in conjunction with the drawings. It will be noted that the vertical column of key figures is not applied to the input power supply lines of the electrical circuit.

As shown in FIG. 10, electrical current derived from three phase supply conductors L1, L2 and L3 is transmitted via the fused disconnect switch 39 to energize conductors 201, 202 and 203. The conductors 201 and 202 are connected to a transformer 204 for supplying current of a reduced voltage for energizing control circuit conductors 205 and 206. To start the feed motor 46 and the spindle motor 210 and activate the control circuit for operating the machine, a master start button switch 38 is momentarily depressed, thereby completing a circuit from the control conductor 205 through the contact bar of the master start switch 38, a line 212 to a line 213. From line 213 current flows to one terminal of the relay coil 217 operative to energize the feed motor 46. From the coil 217, the circuit continues through a conductor 218 and the energized conductor 206 connected to the output of the transformer 204. Upon energization of the feed motor relay 217 to a closed position, contact bars 217F, shown in the power supply circuit, are moved to a closed position completing a circuit from supply conductors 201, 202 and 203 to energize the feed motor 46. Simultaneously with the closing of the contact bars 217F, an associated contact bar 217-4 is moved to a closed position completing a circuit from energized conductor 212 to a conductor 221. With the push button switch 38 depressed, current for energizing the spindle motor starting current flows from conductor 221 through a conductor 225 to a conductor 226. From conductor 226 current continues through the normally closed master stop button switch 36, a conductor 227, and thence via a closed contact bar 228 associated with spindle direction selector switch 30 to a normally closed contact bar 230-2 associated with spindle right relay 230. The circuit continues from the closed contact bar 230-2 via a conductor 231, a spindle left relay 232 and a conductor 233 to the conductor 206.

Upon energization of the spindle left relay coil 232, contact bars 232-SL are immediately closed to transmit power from the power supply conductors 201, 202 and 203 to effect energization of the spindle motor 210. In addition, a normally open contact bar 232-2 associated with the spindle left relay 232, is moved to a closed position completing a holding circuit for both the spindle left relay 232 and the feed motor relay 217 upon release of the master start button switch 38. Current then flows from the energized conductor 205 through the closed contact bar 232-2 and thence via the conductor 226 and the normally closed contact bar of the master stop button switch 36 to the spindle left relay coil 232 as previously described. The holding circuit for the feed motor relay 217 is then completed via the now closed contact bar 232-2, conductors 225 and 221, and contact bar 217-4 to the conductor 213. From the conductor 213 the circuit is completed to the feed motor relay 217 as hereinbefore described. A normally closed contact bar 232-3 is moved to an open position upon energization of the spindle left relay 232 and serves as a safety device to prevent simultaneous actuation of the spindle right relay 230. The usual overload heater coils 210-OL and 46-OL are respectively interconnected in the power supply to the spindle motor 210 and feed motor 46 respectively. It will be apparent that contacts (not shown) associated with coils 210-OL and 46-OL operate in well known manner to deenergize one or another of the control relays.

Rightward spindle rotation is effected by rotating the spindle direction selector switch 30 to a rightward position, thus moving the contact bar 228 out of bridging engagement with the conductor 227, and moving a lower contact bar 236 associated with the switch 30 into bridging engagement with conductors 237 and 238. Energization of the spindle right relay 230 moves the normally open contacts 230-SR to a closed position transmitting power from the power input lines 201, 202 and 203 to the spindle motor 210 to effect rightward spindle rotation. Simultaneously therewith a normally open contact bar 230-3 is closed to establish a holding circuit for the spindle right relay 230 and the feed motor relay 217 and a normally closed contact bar 230-2 is moved to an open position. It will be noted that the rotatable spindle direction selector switch 30 is always positioned to effect the required direction of spindle rotation prior to depressing the master start button switch 38.

To interrupt the holding circuit to one or another of the spindle motor relays 230 or 232 and the feed motor relay 217, the master stop button switch 36 is momentarily depressed, first effecting deenergization of the energized relay 230 or the relay 232. Deenergization of the relay 230 or the relay 232 opens its normally open associated contact bar 230-3 or the contact bar 232-2, respectively, interrupting the holding circuit energizing the spindle relay 230 or the spindle relay 232 as well as the feed motor relay 217. Opening the contact bar 230-3 or 232-2 also interrupts the circuit energizing the feed motor relay 217, thereby deenergizing it which, in turn, moves its normally open contact bar 217-4 to the open position.

It will now be assumed that both motors have been energized by depressing the master start button 38, thereby conditioning the remainder of the control circuit for operation in either manual or automatic mode. Energization of the conductor 212, energizes a conductor 212A connected along, horizontal line 9, to energize a conductor 240 via the normally closed contact bar of the table stop switch 51. Energization of the conductors 205, 212, 212A, 240, and 206 conditions the various control elements for effecting selected longitudinal displacement of the worktable in manual or automatic mode. Thus, the displacement of the worktable may be effected either manually in response to the manual push button controls or automatically in response to a preselected cycle of operation set up by the various dogs acting in conjunction with the plunger switches 55 to 59, inclusive. Simultaneously with the energization of both motors, a direct current portion of the control circuit mainly represented between key numbers 27 and 41 is energized by primary supply conductors 241 and 242 respectively. Conductor 214 is connected at one end to energize conductor 226 at its opposite end to a rectifier bridge 243. Similarly, conductor 242 is connected between energized conductor 206 and a terminal of the rectifier bridge 243. The output terminals of the rectifier bridge 243 are connected to conductors 245 and 246, respectively, to supply direct current upon energization of the rectifier bridge.

When the electrical control circuit is dynamically activated preparatory to machine operation, as described, both directional clutches 130 and 131 are immediately and simultaneously energized to engaged position to brake the worktable 42 against displacement in either direction. The directional clutches 130 and 131 are actuated by means of solenoids 250 and 251, respectively, which are connected to the direct current conductors 245 and 246. In the dynamically activated condition, a circuit is completed from conductor 245 through a normally closed contact bar of table crank interlock switch 253, a conductor 254, a conductor 255 and through a normally closed contact bar 257-40 associated with a rapid traverse control relay 257, line 24, to a conductor 258. The circuit continues from conductor 258 through a normally closed contact bar 260-39 associated with a table left control relay 260, line 14, and thence via a conductor 261 to the control solenoid 250 for clutch 130, FIG. 8, which is connected to the conductor 246. At the same time, a parallel circuit is completed from the conductor 258 via a conductor 262, a normally closed contact bar 263-40 associated with a table right control relay 263, line 20, and thence through a conductor 265 to the solenoid 251, for engaging the clutch 131, FIG. 8, which is connected to the conductor 246. Simultaneously with the energization of the solenoids 250 and 251 a spindle brake solenoid 265, line 32, is energized to maintain the spindle in a stopped condition. A circuit is completed from the energized D.C. conductor 245 to a conductor 266, a normally closed contact bar 267-32 associated with a spindle "run" relay 267, line 8, and thence through conductor 268 to the solenoid 265 connected to the D.C. conductor 246.

With the control circuits energized as hereinbefore described, it will be evident that a spindle drive solenoid 270 as well as solenoid 271 for activating the feed clutch 112 and solenoid 272 for activating the rapid traverse clutch 122 are deenergized. The spindle "drive" solenoid 270 is associated with a spindle drive clutch (not shown) that is engageable for transmitting power from the energized spindle motor 210 to rotate the tool spindle 26, FIG. 1. In order to energize the spindle solenoid 270 and simultaneously deenergize the spindle brake solenoid 265 for effecting spindle rotation, the push button switch 35, line 7, is depressed to energize the spindle control relay 267. Momentary actuation of switch 35, completes a circuit from the energized conductor 221 via a conductor 273, through the normally closed contact bar of the spindle stop switch 37, and thence through the conductor 275 to the now closed contact bar of the switch 35. The circuit continues through a conductor 276 to a conductor 277 and thence to the relay 267 connected to the conductor 206. Energization of the relay 267 opens the normally closed contact bar 267-32 and simultaneously closes the normally open contact bar 267-29 to effect spindle rotation.

If the selector switch 35 has been rotated to a "jog" position, the spindle relay 267 will only be energized as long as the spindle selector switch 35 is depressed. If the spindle selector switch 35 is rotated to the "run" position as shown in FIG. 10, depressing the push button selector switch 35 to energize the spdinle run relay 267 will simultaneously establish a holding circuit. A holding circuit will be completed from the conductor 275 through a conductor 278, a closed contact bar 280 of the selector switch 35 and thence through the now closed normally open contact bar 267-8 associated with the relay 267 to the conductor 277. Maintaining the relay 267 energized maintains the contact bar 267-32 in open postion and the contact bar 267-29 in closed position to effect continuous spindle rotation.

As a prerequisite to operating the worktable 42, either during automatic or manual mode, it is necessary to momentarily depress the spindle switch 35 after the switch has been positioned to the "run" position as shown in FIG. 10. When the spindle selector switch 35 is in the "jog" position, contact bar 280 is moved to the open position to preclude establishing a seal-in circuit upon subsequent closure of contact 267-8.

Assuming the spindle selector switch 35 is positioned in the "run" position to maintain the spindle relay 267 in a continuously energized condition, energization of the relay 267 will close two normally open contact bars 267-16 and 267-22. With these circuit conditions established, the worktable 42 may be moved automatically, by selectively actuating the plunger switches 55 to 58, inclusive, after actuating one or another of the manually operated switches 50, 52 and 53, inclusive, to start movement. As shown in FIG. 9, rapid rate and feed rate functions in both directions are effected by dogs actuating one or another of the plunger switches 55 to 58, inclusive, and a dynamic stopping function is effected by actuating plunger switch 59. Reverse functions in either direction are effected by a respective dog engaging a combination of plunger switches 55 to 58, inclusive, and, likewise, the end limit dogs also engage a pair of switches.

A unique feature and important advantage achieved by the cooperation of the plunger switches 55 to 59, inclusive, and the electrical control circuit in FIG. 10, is the fact that the circuit is directionally sensitive to the direction of worktable displacement during any automatic cycle of operation. In other words, the control circuit is selective in responding to the actuation of the plunger switches when moving in a particular direction. Thus, for example, when the worktable 42 is moving leftwardly, neither direction nor rate of rightward table displacement is effected by the fact that particular dogs are moved relative to the control post 47 and actuate the particular switches for rightward movement. Similarly, when the worktable is moving rightwardly, actuation of the feed left and rapid left plunger switches 55 and 56 will not effect the continuing rightward movement of the worktable 42.

Referring now to FIGS. 6 and 7, particular cycles of automatic operation will now be described. FIG. 6 illustrates the placement of dogs for a single automatic cycle and FIG. 7 illustrates a dual or split cycle of operation having a dynamic center stop function. It is to be understood that the cycles of operation set forth in both FIGS. 6 and 7 are for illustrative purposes only and in no way to be construed as a limitation of the invention herein disclosed. It will be apparent that the various dogs secured to the table 42 can be rearranged and positioned in various other combinations to obtain any predetermined cycle of operation.

To illustrate a continuous automatic cycle operation effected by means of the various dogs engaging the plunger switches 55 to 58, inclusive, reference is now made to FIG. 6. As there shown, various dogs have been secured to the worktable 42 in a manner to effect a continuous automatic cycle of movement for the worktable 42.

The description of the automatic cycle of operation illustrated in FIG. 6 will be started by first assuming that the machine has been dynamically activated for automatic operation. Thus, the manual-automatic selector switch 33, line 17, is in the "automatic" position as shown in FIG. 10, the master start button switch 38 has been momentarily depressed effecting energization of the feed motor and that the spindle run switch 35 is in the "run" position and has been momentarily depressed to energize the spindle motor. The holding circuits established to maintain both motors in an energized condition will be effected as described hereinbefore. Placing the manual-automatic selector switch 33 in the "automatic" position moves a contact bar 285 into bridging engagement with conductors 286 and 287, and a contact bar 288, line 22, into bridging engagement with conductors 290 and 291. At the same time, a contact bar 292, line 18, is moved out of bridging engagement between the conductors 293 and 294. As hereinbefore described, dynamic activation of the machine by depressing the master start button switch 38 and the spindle run switch 35 energizes the directional clutch solenoids 250 and 251 and the spindle clutch solenoid 270, while the spindle brake solenoid 265 is simultaneously deenergized.

For the purpose of illustrating the automatic cycle of operation shown in FIG. 6, it will be assumed that the worktable 42 is in a central position relative to the plunger switches 55 to 59, inclusive, as shown in phantom in FIG. 6. To initiate the automatic cycle of operation with a rightward table movement, the manually operated table right switch 52 is momentarily depressed. This action will establish a proper electrical circuit, FIG. 10, to move the table rightwardly relative to the plunger switches 55 to 59, inclusive, and will so continue in automatic operation under the influence of dogs actuating the various switches establishing other control circuits, until the table stop switch 51 in line 9, is momentarily depressed to stop table movement.

When the table right switch 52 is momentarily depressed, a circuit is completed from the conductor 240 via a conductor 301, a now closed contact bar 52U of the table right switch 52, and a conductor 302 to a table run relay 303. From the relay 303 the circuit continues via a conductor 305 to the conductor 206. Simultaneously therewith, a parallel circuit is established for energizing the table right relay 263, line 20. This circuit is completed from conductor 302 via a conductor 306, a conductor 307 to a normally closed contact bar 59L of the plunger stop switch 59. From contact bar 59L the circuit continues via a conductor 308, a vertical conductor 310, a normally closed contact bar 58U of the plunger switch 58, and a conductor 311 to a vertical conductor 312.

As shown in FIGS. 6 and 6A, none of the dogs are in engagement with any of the plunger switches 55 to 59, inclusive at the moment of starting. Therefore, dynamic activation of the machine, as hereinbefore described, will also energize relays 295 and 296, lines 9 and 10, and which respectively constitute extensions of normally closed plunger switches 56 and 57. A circuit is completed from conductor 212A to a conductor 297, a normally closed contact bar of the plunger switch 56 and a conductor 298 to the relay 295, and thence to the conductor 206. Relay 296 is energized via a circuit from conductor 212A via a conductor 299, through a normally closed contact bar of the plunger switch 57 and a conductor 300 to the relay 296, which, in turn, is connected to the conductor 206.

The manually initiated table right starting circuit thus continues from the conductor 312 through the now closed contact 295–19 associated with the relay 295, a vertical conductor 330, to a normally closed contact bar 260–20 associated with the control relay 260, line 14. From there, the circuit continues through a normally closed contact bar 50L of the table left switch 50, a conductor 331 to the relay 263, and thence via a conductor 332 to the conductor 206. As this occurs, a parallel circuit is established via a conductor 333 to energize indicator light 335 which, when illuminated, indicates that the circuit is established for rightward table movement.

To retain the table right directional relay 263 energized upon release of the manual push button 52, a holding circuit is established from conductor 240 along line 16 through the now closed contact bar 263–16, a conductor 336, a closed contact bar 267–16 associated with the energized spindle "run" relay 267, and a now closed contact bar 303–16 associated with the table "run" relay 303 to a conductor 337 connected to the conductor 307. From the conductor 307 the circuit for energizing the relay 263 continues as hereinbefore described.

It will be noted that, as the manually operated push button switch 52 was depressed and the contact bar 52U placed in bridging engagement with the conductors 301 and 302, a contact bar 52L in horizontal line 14 associated with the switch 52, was moved into the open position interrupting the bridging engagement between conductors 340 and 341 thereby preventing simultaneous engagement of the table left relay 260 when the table right relay 263 is energized. Further, it will be noted that upon releasing the push button 52 the contact bar 52L moves into bridging engagement with the conductors 340 and 341. To maintain the circuit to the relay 260 interrupted upon release of the push button 52, a normally closed contact bar 263–14 is simultaneously moved to the open position with the energization of its associated relay 263. In addition to the contact bars 263–16 and 263–14, energization of the relay 263 also opens and closes various other contact bars associated with it and contained in various parts of the electrical circuit. To this end, the contact bar 263–41 is moved to a closed position and the contact bar 263–40 is moved to the open position upon energization of the relay 263. Since contact 257–38 is open, this action results in interrupting the electrical circuit to the solenoid 251 to deenergize it, while maintaining the circuit to the solenoid 250 energized. Thus, the directional clutch 131 is deactuated while the directional clutch 130 remains actuated to cooperate with the feed clutch 112 to effect a feed right movement of the worktable 42. The solenoid 271 associated with the feed clutch 112 is energized by a circuit completed from conductor 245 via a normally closed contact bar 257–36 and a conductor 340 to the now closed, normally open, contact bar 303–36 associated with the table run relay 303. From the closed contact bar 303–36 the circuit continues to a conductor 341, the solenoid 271 and a conductor 342 to the conductor 246.

With the rightward feed conditions established as hereinbefore explained, the worktable 42 continues to feed in a rightward direction until a proper dog actuates a switch to change the rate or direction of movement. As the table continues moving rightwardly, the right feed dog 71, FIGS. 6 and 6A, engages the plunger switch 57. However, since the worktable 42 is moving rightwardly at a feed rate, engagement of the feed right dog 71 with the plunger switch 57 has no effect upon the cycle at this particular time. Inasmuch as this particular portion of the cycle is normally at the rapid rate, as shown in FIG. 6A, however; in subsequent cycles engagement of the dog will change the rate from rapid to feed.

Thus, rightward movement continues at feed rate until the rapid dog 72 and the reverse dog 68 engage the plunger switches 55 and 57, 58 respectively in a manner to initiate leftward movement of the worktable at rapid rate. It will be noted that when the feed dog 71 engages the plunger switch 57 it moves the normally closed contact bar associated therewith to an open position momentarily and interrupts the electrical circuit to the relay 296 thereby deenergizing it. Deenergization of the relay 296 opens and closes various contact bars associated therewith throughout the control circuit, as will hereinafter be explained.

In the electrical control circuit for rightward feeding movement established prior to engagement of the dog 71 with the plunger switch 57, deenergization of the relay 296 will return the contact bar 296–19 to its normally open position and the contact bar 296–20 to its normally closed position. Opening the contact bar 296–19 has no effect upon the electrical circuit since the circuit is maintained from conductor 310 through the closed contact bar 58U of the plunger switch 58 to the conductor 311. From the conductor 311 the circuit continues through the conductor 312, the now closed contact bar 295–19, the vertical conductor 330 to the normally closed contact bar 260–20 and thence to the relay 263. Closure of the contact bar 296–20 establishes a parallel circuit from the conductor 311 to the conductor 330. In addition, another parallel circuit is established via a normally closed contact bar 364–18 which completes a circuit between conductors 312 and 330 except when the worktable is in a dynamically stopped condition at which time the relay 364 is energized which moves the contact bar 364–18 to the open position. Thus, it will be apparent that when the worktable is already moving rightwardly at feed rate, an engagement of the feed right dog 71 with the plunger switch 57 has no effect upon the continued rightward feeding movement.

As the worktable 42 continues to move rightwardly, the rapid dog 72 and the reverse dog 68 moves into engagement with the plunger switches 55, 57 and 58 It will be noted that the reverse dog 68 may be secured to the table alone for effecting reversal of the direction of table movement. By securing the rapid left dog 72 to the table in coordinated relationship with the reverse dog 68, the automatic control circuit is so established as to effect immediate leftward direction movement at a rapid rate. Although the left rapid dog 72 engages switch 55 while moving rightwardly slightly in advance of the reverse dog, engaging switches 57 and 58, switch 55 has no effect until reversed movement begins. As shown in FIG. 6, the rapid left dog 72 is positioned adjacent the reverse dog 68 and presents a land 345 extending partly aligned in overlapping relationship above a land 346 of the reverse dog 68.

As shown in FIGS. 4 and 6, the outwardly projecting land 345 of the left rapid dog 72 is spaced between two angularly diverging cam faces 345A and 345B. Likewise the land 346 of the reverse dog 68 is spaced between two angularly diverging cam faces 346A and 346B. In a similar manner, all of the switch actuating dogs are provided with lands spaced forwardly the same distance relative to the rearwardly projecting actuating plungers 55 to 59, inclusive, carried by the control post. Irrespective of the direction of movement, the angular cam faces are disposed to effect gradual engagement of one or another of the cycle control switches. During table travel, complete actuation of switches 55, 58 and 59 does not occur until the corresponding short plungers are moved into engagement with the land of an actuating dog. Switches 56 and 57 are disposed to be actuated as the corresponding long actuating plungers reach an intermediate point on an angular cam face of an actuating dog, and remain actuated during continued dog movement. It will be apparent that this arrangement provides an improved method of obtaining sequential switch actuation, and greatly simplifies the configuration of a coacting switch actuating control dog.

This specific sequential timing relationship is clearly illustrated in connection with the reverse dog 68 in FIG. 6, showing likewise the associated rate change dog 72. As the table moves rightwardly, the angular cam face 345A of rapid left dog 72 initially engages the plunger of switch 55 and actuates it prior to the plunger being engaged by the land 345. In other words the switch 55 is actuated before the plunger thereof is engaged by the land 345 at the point indicated by the dotted line 55A. Although actuated, switch 55 exerts no control function until the instant of reversal in a leftward direction.

Next, the angular cam face 346A of reverse dog 68 engages the long plunger of switch 57, with full actuation of this switch being effected as indicated by the dotted line 57B in FIG. 6. The same continuous, angular cam face 346A likewise engages the short plunger of control switch 58, with actuation of this switch being effected shortly before the plunger is engaged by the land 346, indicated by the dotted line 58C. Actually, the dotted lines 55A, 57B and 58C are schematically representative of the sequence of switch actuation during the interval of rightward travel prior to reversal. It will be apparent that in all cases switch actuation occurs during engagement of an angular cam face, with actuation being maintained by the associated land. For example, switch plunger 58 operates to actuate switch 58 at a point midway between the dotted lines 57B and 58C schematically indicating actuatings.

As the plunger switches 55, 57 and 58 are sequentially actuated to effect reversal to a rapid left direction, it will be noted that at the moment of reversal the plunger switches 55, 57 and 58 are simultaneously retained in an actuated condition by their respective actuating dogs. As this occurs, various changes take place within the circuit. These changes include energizing the table left relay 260, rapid traverse control relays 257 and 350 and deenergization of the table right relay 263. In addition, selected holding circuits are established to maintain the relays 260, 350, and 257 energized after the dogs 72 and 68 are moved from engagement with the plunger switches 55, 57 and 58.

As the table 42 moves rightwardly and the rapid dog 72 engages the plunger switch 55, a contact bar 55L, line 21, associated therewith is moved to a closed position connecting a conductor 351 to a conductor 352 conditioning the circuit for subsequent energization of rapid traverse relay 257. Simultaneously therewith, a contact bar 55U also associated with the plunger switch 55 will be moved to the open position interrupting the circuit between conductors 353 and 355. It will be noted that this action has no effect on the continued rightward movement of the worktable. Next, the dog 68 will engage the plunger switch 57 and move its contact bar to the open position and interrupt the circuit between conductors 299 and 300 causing deenergization of the relay 296. Deenergization of the relay 296 opens the associated contact bar 296–19 interrupting a parallel circuit energizing the relay 263. In addition, deenergization of the relay 296 moves contact bars 296–16, 296–20A and 296–23 to the open position and closes the associated contact bars 296–20 and 296–22. The opening and closing of the various contacts associated with the relay 296 establishes circuit conditions for subsequent energization of the table left relay 260 and the rapid traverse relays 257 and 350.

Upon slightly further rightward movement, the dog 68 will actuate the plunger switch 58 and move an associated contact bar 58L into bridging engagement with conductors 356 and 357, and another associated contact bar 58U to the open position interrupting the circuit between conductors 310 and 311. Since the contact bar 296–19 is in its normally open position due to the deenergization of the relay coil 296, moving the contact bar 58U into the open position causes deenergization of the table right relay 263 terminating further rightward movement of the table. Deenergization of the relay 263 closes contact bar 263–40 energizing solenoid 251 associated with the directional clutch 131. Energization of the solenoid 251 engages the directional clutch 131 producing a dynamic braking effect of the worktable since the solenoid 250 associated with the directional clutch 130 is also energized and the clutch engaged. At the same time, the contact bar 263–41 is moved to the open position interrupting a non-energized circuit between conductors 265 and 360. In addition, a contact bar 263–14 is simultaneously moved to the closed position to condition a circuit for the energization of the relay 260 and a contact bar 263–16 is moved to the open position to interrupt the holding circuit for the relay 263. Another contact bar 263–23 is also moved to the open position.

Upon closure of the contact bar 263–14 the table left relay 260 is energized for effecting subsequent leftward table movement. The relay 260 is energized by a circuit completed from the conductor 240, along line 22, via the conductor 356, the now closed contact bar 58L, the conductor 357, the normally closed contact bar 296–22 of deenergized relay 296 to the now closed contact bar 295–22 of the energized relay 295. From the contact bar 295–22 the circuit continues via the vertical conductor 287, contact bar 285 of the switch 33, conductors 286, 361 and 336 to the now closed contact bar 267–16 of energized relay 267. The circuit continues via the closed contact bar 303–16, conductors 337 and 307, the normally closed contact bar 59L associated with the plunger stop switch 59 to the conductor 308. From there the circuit continues through the now closed contact bar 295–14 of energized relay 295, a normally closed contact bar 364–14 associated with a reset relay 364, the normally closed contact bars 263–14; conductor 340, normally closed contact bar 52L and conductor 341 to the relay 260 which, in turn, is connected to the conductor 206. Simultaneously therewith, a parallel circuit is completed from conductor 341 to the conductor 206 to illuminate an indicator light 365 providing visual indication of the energization of the table left, directional control relay 260.

Energization of the relay 260 effects closure of a normally open contact bar 260–17 associated therewith which establishes an overlapping holding circuit to maintain the relay 260 energized after the contact bar 58L, line 22, returns to open position upon leftward movement of the worktable. This holding circuit connects the conductor 361 with the conductor 240 via the now closed contact bar 260–17.

At the same time, contact bar 260–20 is moved to the open position to positively prevent energization of the table right relay 263. Simultaneously therewith, a contact bar 260–21 is moved to a closed position establishing a circuit for the energization of relays 257 and 350. Since the contact bar 55L is in a closed position due to the dog 72 engaging the plunger switch 55, a circuit is completed along line 21 from conductor 240, via the conductor 351, the closed contact bar 55L, and conductor 352 to the now closed contact bar 295–21 associated with the relay 295. The circuit continues through the now closed contact bar 260–21, a conductor 367, the now closed contact bar 267–22 and conductor 290 to the closed contact bar 288 of the switch 33; and thence via conductor 291, and a normally closed contact bar 368 to the relay 350 which, in turn, is connected to the conductor 206. A parallel circuit for energizing the relay 257 is established from conductor 291 via a vertical conductor 370, a now closed contact bar 303–24 associated with the relay 303 to the relay 257 connected to the conductor 206. A second parallel circuit is established from the conductor 370 to the conductor 206 to energize an indicator light 371 providing visual indication of the energization of the relays 257 and 350. Energization of the relay 350 closes associated contact bars 350–20 and 350–23. Closure of the contact bar 350–20 completes a holding circuit from conductor 240 through the now closed contact bar 350–20 and conductors 372 and 373 to the conductor 352 to maintain the relays 257 and 350 energized when the contact bar 55L moves into the open position interrupting the circuit between conductors 351 and 352. At the same time, closure of the contact bar 350–23 establishes a parallel overlapping holding circuit with the contact bar 260–17, which is closed upon energization of relay 260. This circuit is completed from conductor 240 via the now closed contact bar 350–23, conductors 376 and 377, the now closed contact bars 296–22 and 295–22, conductor 287, contact bar 285 and conductor 286 to the conductor 361. Upon reenergization of the relay 296, occurring when the dog 68 is moved leftwardly out of engagement with the plunger switch 57, this circuit is interrupted by the opening of the contact bar 296–22. Likewise, as the dog 68 moves out of engagement with the plunger switch 58 the contact bar 58L, line 22, will interrupt the circuit between the conductors 356 and 357 and the contact bar 58U, line 20, will bridge the circuit between conductors 310 and 311.

Simultaneously with the energization of relays 260, 257 and 350 and the deenergization of relay 263 for effecting a reversal from rightward feeding movement to leftward rapid rate movement, operation of the relays is operative to effect certain required circuit changes in the D.C. solenoid circuit. Deenergization of the table right relay 263 moves the contact bar 263–40 into closed position energizing the solenoid 251 associated with the directional clutch 131. Energization of the relay 260 opens the contact bar 260–39, interrupting the circuit between the conductors 258 and 261 that energized the solenoid 250, and closes the associated contact bar 260–38 conditioning a circuit for subsequently energizing the solenoid 250. At the same time, in sequential coordinated relationship, energization of the rapid traverse relay 257 moves associated contact bar 257–34 to a closed position to energize the rapid traverse clutch solenoid 272, and moves associated contact bar 257–36 to an open position to deenergize the feed clutch solenoid 271. Simultaneously therewith, the associated contact bar 257–40 is opened to deenergize the solenoid 251, and the contact bar 257–38 is closed to energize the solenoid 250. The circuit for energizing the solenoid 250 is completed from the conductor 245 through the normally closed contact bar 253, through the now closed contact bar 257–38 and conductor 360 to the now closed contact bar 260–38. From the contact bar 260–38 the circuit continues via conductor 261 and the solenoid 250 to the conductor 246. It will be noted here that the directional clutch solenoid 250 is energized for either of two conditions, namely, during rightward movement at feed rate and during leftward movement at rapid rate of travel. As hereinbefore described, the solenoid 250 was energized via a circuit through the contact bar 257–40, conductor 258 and the contact bar 260–39 when operating at rightward feed rate of travel.

To review briefly the worktable displacement from a rightward feed rate to reversal and leftward rapid rate movement, the rapid dog 72 first engages the plunger switch 55. Shortly thereafter, the dog 68 sequentially engages the plunger switches 57 and 58 in closely timed relationship. Although engagement of the plunger switches 57 and 58 is sequential, as shown in FIG. 2 and FIG. 5, actuation occurs practically simultaneously to sequentially deenergize table right relay 263 and energize relays 260, 350, and 257. After the reversal takes place, the worktable 42 continues to move leftwardly at rapid rate and the dogs 68 and 72 move out of engagement with the plunger switches 57, 58 and 55, respectively, permitting the plunger switches to resume their normal positions as shown in FIGS. 2 and 10. The immediate leftward table movement at rapid rate is effected mechanically through the cooperation of the rapid traverse clutch 122, actuated by the solenoid 272, and the directional clutch 130 actuated by the solenoid 250.

With leftward movement of the worktable 42 established at rapid rate, the worktable will continue to move at this rate until a proper dog actuates a plunger switch or switches to effect a change in the rate or direction of displacement. As the table continues leftwardly at rapid rate, the first dog to engage a plunger switch is the feed right dog 71 engaging the plunger switch 57. Dog 71 momentarily depresses the plunger switch 57 deactuating the relay 296; however, this action has no effect on the circuit established for rapid leftward movement. The worktable 42 continues to move leftwardly at rapid rate until an angular cam face 370 associated with the left feed dog 70 engages the plunger switch 56 carried by the control post 47. Momentary actuation of the plunger switch 56, during leftward travel, moves its associated contact bar, line 9 in FIG. 10, into an open position interrupting the circuit between conductors 297 and 298 to deenergize the relay 295. Deenergization of the relay 295 moves an associated contact bar 295–21 into momentary open position, interrupting the circuit to the automatic rapid traverse relay 350 and the rapid traverse control relay 257. With the deenergization of the rapid relays 350 and 257 leftward rapid rate is changed to leftward feed rate without interrupting the continuity of the leftward movement. Simultaneously with the deenergization of the automatic rapid traverse relay 350, an associated contact bar 350-20 is moved to its normally open position. Thus, the holding circuit for the relays 350 and 257 is interrupted after the relay 295 becomes reenergized, as the feed dog 70 moves out of engagement with the plunger switch 56 thereby permitting its contact bar to reestablish the circuit between conductors 297 and 298.

Deenergization of the rapid traverse control relay 257 effects deactuation of the rapid traverse clutch 122 and the directional clutch 130, FIG. 9, and actuation of the feed clutch 112 and the directional clutch 131. To this end, the contact bar 257-34 is moved to its normally open position, interrupting the circuit to the rapid traverse solenoid 272 and the contact bar 257-38 is moved to its normally open position interrupting the circuit to the solenoid 250 associated with the directional clutch 130. Simultaneously therewith, the contact bar 257-36 is moved to its normally closed position establishing a circuit from the conductor 245 to energize the feed rate solenoid 271 via the now closed contact bar 257-36, conductor 340, closed contact bar 303-36 and conductors 341 and 342 to the conductor 246. At the same time, contact bar 257-40 is moved to its normally closed position, establishing a circuit to energize the solenoid 251 associated with the directional clutch 131. This circuit is completed from conductor 254 conductor 255, the now closed contact bar 257-40, conductors 258 and 262, the closed contact bar 263-40 and conductor 265 to the solenoid 251, which is connected to the conductor 246. By simultaneously deactuating the clutches 122 and 130 and actuating the clutches 112 and 131, FIG. 8, the direction of rotation of the shaft 127 is reversed thereby producing an instantaneous braking effect resulting in an immediate change from leftward rapid rate movement to leftward feed rate movement.

After establishing leftward movement at feed rate, the worktable 42 continues to move at feed rate until the right rapid traverse dog 73 and the reverse dog 63, FIG. 6, engage the plunger switches 58, 55 and 56, respectively. Actuation of the plunger switches 55 and 56 effect a reversal of the direction of movement of the worktable 42 from a leftward to rightward direction. Since the rate change dog 73 is secured to the worktable adjacent to the reverse dog 63, actuation of the plunger switch 58 effects immediate rapid rate displacement upon reversal of the direction of movement of the worktable 42. In the absence of the rapid right dog 73, FIG. 6, the reverse dog 63 would effect reversal of the worktable 42 at feed rate in a rightward direction. Referring to FIGS. 2 and 6, the plunger switch 58 will be actuated first by the rapid right dog 73 shortly before the subsequent sequential actuation of plunger switches 56 and 55 by the reverse dog 63. Initial actuation of the plunger switch 58 by the dog 73 will have no effect on the continued leftward feeding movement of the worktable 42, since no circuit is interrupted or completed by the opening of the associated contact bars 58U and 58L, FIG. 10. However, sequential actuation of the plunger switches 56 and 55 effect reversal in a rightward direction at which time the actuation of the plunger switch 58 becomes operative to effect rapid rightward movement.

Actuation of the plunger switch 56, which occurs first because plunger switch 56 is provided with a longer plunger than the plunger switch 55, as shown in FIG. 2, interrupts the circuit between conductors 297 and 298, line 9 in FIG. 10, to deenergize the relay 295. Deenergization of the relay 295 moves the associated contact bar 295-14 to its normally open position preparatory to subsequent deenergization of the table left relay 260. Upon slightly further leftward movement of the worktable 42, the angular cam face 65 of the dog 63 actuates the plunger switch 55 moving the associated contact bar 55U to an open position effecting deenergization of the table left relay 260. Deenergization of the table left relay 260 effects closure of an associated contact bar 260-20 conditioning a circuit for subsequent energization of the table right relay 263. Simultaneously with the actuation of plunger switch 55, an associated contact bar 55L is moved to closed position bridging the conductors 351 and 352, completing the circuit for energization of the relay 263. This circuit is completed from conductor 240 through conductor 351, the now closed contact bar 55L, conductors 352 and 373, and a conductor 372 to the now closed contact bar 295-20. From the contact bar 295-20, the circuit continues via the now closed contact bar 296-20A, conductor 287, closed contact bar 285, and conductors 286, 361, and 336, to the now closed contact bar 267-16. The circuit continues through the now closed contact bar 303-16, conductors 337 and 307, the closed contact bar 59L, conductors 308 and 310, to the now closed contact bar 296-19. From there, current flows through the conductor 312, a nomally closed contact bar 364-18 and a vertical conductor 330 to the now closed contact bar 260-20 of the deenergized table left relay 260. The circuit is completed via the closed contact bar 50L, conductor 331 connected to the relay 263, and thence via conductor 332 to the conductor 206 connected to the transformer 204. Simultaneously, a parallel circuit conducts current via conductor 333 to illuminate the indicator light 335.

Energization of the table right relay 263 moves a normally closed contact bar 263-14 to the open position to interrupt the circuit to the table left relay 260, to prevent energization of the relay 260 after the reverse dog 63 moves out of engagement with plunger switches 55 and 56 which will then condition the circuit to that point by the closure of the contact bar 55U and the contact bar 295-14 upon actuation of the relay 295. Simultaneously, a contact bar 263-16 is moved to closed position, establishing a self maintained overlapping holding circuit between conductors 240 and 336 to retain the table right relay 263 energized after the reverse dog 63 moves out of engagement with the plunger switch 55, thereby moving the contact bar 55L to its normally open position. At the same time, an associated contact bar 263-23 is moved to a closed position, completing a circuit for the energization of the automatic rapid traverse relay 350 and the rapid traverse control relay 257. This circuit is completed from conductor 240 via conductor 356, line 22, the now closed contact bar 58L which is closed by dog 73 actuating the plunger switch 58, conductors 357 and 377, and thence via conductor 376 to the now closed contact bar 296-23. The circuit continues through the now closed contact bar 263-23, conductor 367, closed contact bar 267-22 and conductor 290 to the closed contact bar 288, and thence to conductor 291. The relay 350 is energized via a circuit continuing from conductor 291 through the closed contact bar 368 to the conductor 206. A parallel circuit is established from conductor 291 through the vertical conductor 370 and closed contact bar 303-24 to energize the rapid traverse control relay 257 having one terminal connected to the conductor 206. Also at this time, a parallel circuit is established between conductor 370 and conductor 206 to illuminate the indicator light 371. Energization of the relay 350 moves an associated contact bar 350-23 to a closed position establishing a self maintaining overlapping holding circuit between conductors 240 and 376 to retain the rapid relays 350 and 257 energized after the contact bar 58L moves to its normally open position.

In the D.C. circuit for energizing the solenoids, various circuit conditions are established upon the energization of relay 263 and 257. Energization of the table right relay 263 opens the normally closed contact bar 263-40 interrupting the circuit between conductors 262 and 265 to deenergize the solenoid 251. However, associated contact bar 263–41 is moved to a closed position to condition a circuit for practically immediate reenergization of the solenoid 251 which is associated with the directional clutch 131. In sequential relationship, energization of the rapid traverse control relay 257 closes the contact bar 247–38 to establish a circuit for the reenergization of the solenoid 251, and simultaneously moves the contact bar 257–40 to open position to interrupt the circuit to the solenoid 250 via the contact bar 260–39 associated with the table left relay 260, the contact bar at this time being in its normally closed position. The circuit for reenergizing the solenoid 251 is completed from the conductor 254 through the now closed contact bar 257–38, the closed contact bar 263–41 and conductor 265 to the solenoid 251 connected to the conductor 246. Further, energization of the relay 257 opens contact bar 257–36, interrupting the completed circuit between conductors 245 and 340 to deenergize the solenoid 271 associated with the feed clutch 112. At the same time, contact bar 257–34 is closed, completing a circuit for energizing the rapid traverse solenoid 272 associated with the rapid traverse clutch 122. With these conditions established, the rate of travel and direction of movement of the worktable 42 will be changed from feed left to rapid right. Further, as shown in FIGS. 8 and 9, it will be noted that both reversal of direction and change of rate are effected by energizing the rapid traverse clutch 122 and deenergizing the feed clutch 112, with the direction clutch 131 being maintained in its previously actuated position. Since the driving input gears 110 and 118 to the feed clutch 112 and the rapid traverse clutch 122, respectively, FIG. 8, are rotating in opposite directions, it will be apparent that deactuation of the feed clutch 112 and actuation of the rapid traverse clutch 122 will reverse the direction of rotation of the shaft 127.

As the worktable 42 continues to move rightwardly at a rapid rate, the feed left dog 70, FIG. 6, adjustably secured to the worktable will engage the plunger switch 56. However, depressing the plunger switch 56 will have no effect on the control system at this time. It will be noted that a novel feature of the applicants' invention is that the control system is directionally sensitive and will only respond to the influence of certain dogs when moving in a given direction. As indicated in FIG. 6, the control system will respond only to those dogs having "direction arrows" pointing in the actual direction of movement of the worktable at any given time. Thus, since the worktable is moving rightwardly and the "direction arrow" on the dog 70 points leftwardly, a visual indication is provided showing that the control system will not respond to the influence of this dog when moving rightwardly. However, referring to FIG. 10, it will be noted that as the feed left dog 70 actuates the plunger switch 56, line 9, the control relay 295 is momentarily deenergized by the fact that the contact bar associated with the switch 56 is momentarily moved to an open position, interrupting the circuit to the relay.

Inasmuch as deenergization of the relay 295 during rightward movement has no effect on any of the clutch solenoids or the rapid traverse relays, the worktable 42 will continue to move rightwardly at rapid rate. It will be noted, however, that momentary deenergization of the relay 295 establishes a parallel overlapping energizing circuit for the table right relay 263. This parallel circuit is established from conductor 240 through the now closed contact bar 350–20, conductor 372, the closed contact bar 295–20 of the deactuated relay 295, contact bar 296–20A to conductor 287. From conductor 287 the circuit continues through the contact bar 285, conductors 286 and 361 to the conductor 336. Upon reenergization of the relay 295 this parallel circuit is interrupted by the movement of the contact bar 295–50 to the open position.

Since actuation of the plunger switch 56 by the dog 70 has no effect at this time, the worktable continues to move in a rightward direction at rapid rate until the feed right dog 71 depresses the plunger switch 57, effecting an immediate change in rate from rapid to feed. Referring now to FIG. 10, momentary actuation of the plunger switch 57 opens its associated normally closed contact bar, line 10, effecting a corresponding deenergization of the relay 296. Thereupon, the associated contact bar 296–23 is opened to interrupt the holding circuit through the contact bars 350–23 and 263–23 causing deenergization of rapid traverse relays 350 and 257. Deenergization of the relay 350 opens the contact bar 350–23 to preclude reenergization of the relays 350 and 257 upon reenergization of the relay 296.

In the D.C. portion of the circuit, FIG. 10, deenergization of the relay 257 opens the contact bar 257–34 deenergizing the rapid traverse solenoid 272, and closes the contact bar 257–36 to energize the feed solenoid 271. At the same time, contact bar 257–38 is opened interrupting the circuit to the solenoid 251 of the directional clutch 131, and the contact bar 257–40 is closed, immediately establishing a completed circuit through the closed contact bar 260–39 and conductor 261 to energize the solenoid 250 associated with the directional clutch 130. Reversal of shafts 111 and 127, FIG. 8, will produce an instantaneous braking effect on the worktable immediately changing rapid rate to feed rate in a rightward direction.

With these conditions established, the worktable 42 continues to move rightwardly at feed rate until the dog 72 depresses the plunger switch 55 and the dog 68 sequentially depresses plunger switches 57 and 58 for reverse movement of the worktable 42 in a leftward direction at rapid rate.

Referring now to FIG. 6A, there is shown a line diagram illustrating the particular automatic cycle sequence effected by the dogs secured to the worktable in the positions shown in FIG. 6. It will be apparent that this cycle will continue indefinitely until stopped by depressing the manual stop button 51, or by depressing the master stop switch 36 which stops the motors and deenergizes the control system completely. Depressing the stop button 51 interrupts the circuit between conductors 212A and 240 deenergizing the various energized control relays in the circuit for effecting a particular rate and direction of movement. In addition, both solenoids 250 and 251 remain energized to actuate the directional clutches 130 and 131 to brake the worktable against movement in either direction.

Referring now to both FIGS. 6 and 7, a comparison of the dog arrangement in both these figures indicates that the feed dogs 70 and 71, the reverse dogs 63 and 68, and the rapid traverse dogs 72 and 73 are secured within the groove 62 in identical arrangement to provide identical sequential cycling. However, it will be noted that two differences exist between the figures. One difference is the fact that the reverse dogs 68 and 63, FIGS. 7 and 7A, are positioned within the groove 62 in partial combination with limit dogs 77 and 81 respectively, in order that full use may be made of the total length of travel of the worktable. To this end, the dog 68 is slidably positioned within the groove 86 and secured within the slot 62. In like manner, the dog 63 is slidably positioned within the groove 87 of the limit dog 81 and then secured within the groove 62. The rapid traverse dogs 72 and 73 are positioned adjacent the end limit dogs 77 and 81, respectively, providing immediate rapid traverse movement upon reversal of the direction of travel, and being identical to the cycle in FIG. 6. The second difference existing between FIG. 6 and FIG. 7 is the fact that a center stop dog 75 and a rapid traverse dog 73A are secured within the groove 62 intermediate the end limit dogs 76 and 80. The purpose of the center stop dog 75 is to provide a dynamic stop function which conditions the control circuit, FIG. 10, for subsequent, manually initiated movement of the worktable 42 in either direction of travel. It is emphasized that the stop dog 75 may be adjustably positioned in any desired location along the groove 62 for establishing a desired cycle of operation. As shown in FIG. 7, the worktable 42 is so positioned that the stop dog 75 engages the plunger switch 59 and the rapid traverse dog 73A engages the plunger switch 58. With the worktable in this position, table movement can be initiated in either direction of travel by depressing one or another of the manual push button switches 50 or 52.

Assuming the push button 52 is manually depressed, the worktable 42 will move rightwardly at a rapid rate under the influence of the rapid right dog 73A in combination with the center stop dog 75, and will continue to move at rapid rate until the feed right dog 71 actuates plunger switch 57 effecting an immediate change to feed rate. The worktable will then continue to move rightwardly at feed rate until the rapid left dog 72 and the reverse dog 68 sequentially engage plunger switches 55, 57 and 58 to effect reverse movement of the worktable in a leftward direction at rapid rate. Rapid leftward movement will then continue until the plunger switch 59 is again actuated by center stop dog 75, stopping further table movement. It is emphasized that actuation of plunger switch 59 alone will terminate movement of the worktable. As was stated hereinbefore with reference to direction sensitivity of the control circuit when actuated by dogs having a "direction arrow" pointing in the opposite direction of movement, it will be apparent that the right rapid traverse dog 73A has no effect on the automatic control circuit, as the table is moved leftwardly to the stop position. From this center stopped position, leftward table movement can be reinitiated by momentarily depressing the table left push button 50. Since there is no rapid left dog in combination with the center stop dog 75, the table moves leftwardly at feed rate until rapid left dog 72A engages switch 55, changing the rate to rapid traverse. The next rate change, during leftward movement is effected by the feed left dog 70. The worktable then resumes leftward travel at feed rate until the rapid traverse dog 73 and the reverse dog 63 secured to the rightward end of the groove 62 actuate plunger switches 55, 56, and 58 initiating reverse movement in a rightward direction at rapid rate. Upon reversal in a rapid rightward direction of movement, the worktable will continue to move rightwardly at rapid rate until the center stop dog 75 again engages the plunger switch 59 arresting further movement of the worktable 42.

Thus, it will be apparent that by the use of the center stop dog 75 and the arrangement of the feed, rapid, and reverse dogs illustrated in FIG. 7, a split-cycle of automatic operation is set up for performing machining operations upon workpieces being secured to opposite ends of the worktable. To illustrate by way of example, while a machining operation is being performed on a workpiece secured to one end of the table, a new or unfinished workpiece may be secured to the opposite end of the table and vice versa. Irrespective of which end of the table the machining operation is being performed, movement of the worktable is automatically stopped whenever the stop dog 75 engages the plunger switch 59, FIG. 7. Illustrated in FIG. 7A is a line diagram showing the various rates of table movement and direction of movement for the split-cycle operations effected by securing the dogs to the table, as shown in FIG. 7.

In describing the effect of the center stop dog 75, FIG. 7, on worktable movement, it will be assumed that the worktable is traveling rightwardly, after reversal, at rapid rate under the influence of the rapid right dog 73. The effect on the control circuit produced by the feed, rapid, and reverse dogs in FIG. 7, is identical to the effects for the same dogs as described hereinbefore with reference to FIG. 6. Referring to FIG. 7, as the table moves rightwardly at rapid rate the stop dog 75 will engage the plunger switch 59 first, stopping rightward movement of the worktable. However, due to the fact that there will be some coasting or overtravel before complete stopping occurs, the table will continue to move slightly more with the rapid right dog 73A actuating plunger switch 58. It will be noted that the plunger switches 59 and 58 are actuated sequentially in the order just mentioned.

Actuation of the plunger switch 59, FIG. 10, moves associated contact bar 59L to an open position interrupting the circuit energizing the table right relay 263 and moves another associated contact bar 59U to a closed position conditioning a circuit for subsequent restarting of the worktable. Deenergization of the table right relay 263 opens the contact bar 263–16 interrupting the holding circuit to the table right relay 263 between conductors 240 and 336. In addition, interruption of this holding circuit effects deenergization of the table "run" relay 303. Simultaneously, the contact bar 263–23 associated with the relay 263 is moved to the open position, interrupting the energizing circuit to the rapid traverse relays 350 and 257. Deenergization of the rapid traverse relay 350 opens the associated contact bar 350–23 interrupting its holding circuit between conductors 240 and 376.

In the D.C. solenoid circuit, deenergization of the table right relay 263 closes the contact bar 263–40 conditioning a circuit for maintaining the solenoid 251 energized, and opens the contact bar 263–41. With the deenergization of the rapid traverse relay 257, contact bar 257–34 is opened, effecting deenergization of the rapid traverse solenoid 272; and the contact bar 257–36 is closed. Since the table "run" relay 303 is likewise deenergized at this time, its associated contact bar 303–36 is moved to open position, maintaining the circuit to the feed solenoid 271 interrupted. Another contact bar 257–40 associated with the relay 257 is moved to a closed position completing a circuit from the conductor 245 through the now closed contact bars 260–39 and 263–40 energizing both directional clutch solenoids 250 and 251 respectively. As stated hereinbefore, energization of both solenoids 250 and 251 and resultant actuation of the directional clutches 130 and 131, respectively, associated therewith, effects stopping of the table and prevents movement thereof in either direction.

Deenergization of the table "run" relay 303 moves the contact bar 303–12 to its normally closed position and completes a circuit for energizing the reset relay 364. This circuit is completed from conductor 240 to a conductor 385, the now closed contact bar 59U, conductors 386 and 387 to the now closed contact bar 303–12. From the contact bar 303–12 the circuit continues via conductors 388 and 390 to the relay 364 and thence to the conductor 206. Upon energization of the relay 364, a contact bar 364–11 is closed establishing a parallel overlapping holding circuit for energizing the relay 364. At the same time, a contact bar 364–15 is closed, conditioning a circuit for subsequent energization of either the table left relay 260 or the table right relay 263 for restarting table movement in either direction.

At this point it is emphasized that although the deenergization of relays 263, 303, 350 and 257 and the subsequent energization of relay 364 occurs practically simultaneously, a novel feature of the electrical control circuit is the logically arranged sequential deactuation and actuation of various relays. By sequentially operating relays, an interruption is provided in the energizing circuit to the relay 263 that is necessary to effect deenergization of relay 263 prior to the subsequent actuation of relay 364. Deenergization of the relay 263 initiates electrical conditions that bring about a termination of worktable movement, while the subsequent actuation of relay 364 closes the contact bar 364–15 conditioning a circuit for subsequently restarting worktable movement.

To briefly review, sequential deenergization and energization of the various relays, as described hereinbefore, occurs in the following manner. Deenergization of the table right relay 263 is initiated by the dog 75 actuating the plunger switch 59 moving the contact bar 59L to the open position thereby interrupting the circuit to the relay 263. At the same time a contact bar 59U is moved to the closed position conditioning a circuit for subsequently energizing the relay 364. Deenergization of the relay 263 in turn effects deenergization of the rapid traverse relays 350 and 257 whenever the worktable is moving rightwardly at rapid rate. Simultaneously, the associated contact bar 263–16 is opened deenergizing the table "run" relay 303. Deenergization of the table "run" relay 303 opens the associated contact bar 303–16 and closes the associated contact bar 303–12 completing a circuit via the now closed contact bar 59U to energize the relay 364. This circuit is completed as described hereinbefore.

Energization of the relay 364 closes the associated contact bars 364–11 and 364–15. Closure of the contact bar 364–11 establishes a holding circuit, in parallel with the contact bar 303–12 to retain the relay 364 energized upon the reenergization of the relay 303 which opens the contact bar 303–12. Thus, it will be apparent that the relay 364 remains energized via the holding circuit as long as the contact bar 59U remains in the closed position.

In addition, energization of the relay 364 also moves the contact bar 364–15 to the closed position conditioning a circuit for subsequently energizing one or another of the relays 260 or 263. It is again emphasized here, that the contact bar 364–15 is closed after the contact bar 59L is opened, thereby providing the necessary interruption in the energizing circuit to relay 263 to terminate worktable movement.

The operable relationship between the contact bars 59U, 59L and 364–15 should be carefully noted. As described above, where a stopping function is called for by the stop dog 75 engaging the plunger switch 59, the contact bar 59L opens prior to the closing of contact bar 364–15. However, when the worktable movement is restarted, there is an overlapping parallel circuit established between the contact bars 59L and 364–15 to preclude an interruption in the energizing circuit to various relays on restarting. The overlapping parallel circuit condition will be described hereinafter in connection with a restarting operation.

It will be apparent that, although the above stopping function was described in connection with a rapid right table movement, the sequential operation of the relays providing the necessary interruption in the electrical circuit will exist equally as well when the worktable 42 is moving at either feed right, rapid left or feed left rates of movement since one or another of the relays 260 or 263 are energized during these rates and direction of movement.

Upon initial engagement of the stop dog 75 with the plunger switch 59 and shortly thereafter, the worktable 42 will continue to move rightwardly before coming to a dynamic stopped condition. As this occurs, the rapid right dog 73A actuates the plunger switch 58. Actuation of the plunger switch 58 moves its associated contact bar 58L to a closed position thereby conditioning a circuit for subsequent energization of the rapid traverse relays 350 and 257 upon re-initiating rightward movement from the dynamic stopped condition. In other words, the control circuit is so conditioned as to effect immediate rapid right movement from a stopped condition by merely depressing the table right push button 52.

To initiate rightward movement of the worktable at rapid rate, the table right push button 52 is momentarily depressed, moving its associated contact bar 52U into bridging engagement between conductors 301 and 302 thereby completing a circuit for energizing the table run relay 303. Reenergization of relay 303 effects movement of associated normally closed contact bar 303–12 which interrupts the circuit from conductor 307 to 308. During this restarting interval, however, reset relay 364 remains energized via seal-in contact bar 364–11, to insure retention of contact bar 364–15 in closed position as long as switch contact bar 59L is in the open position by engagement with the stop dog 75. Thus, contact 364–15 provides a shunt path for restarting, until contact bar 59L is closed, immediately after which contact bar 364–15 is opened. There is an overlap of sufficient duration, with contact bar 364–15 and switch contact 59U both being closed, momentarily, to prevent an interruption of the restarting circuit as the stop dog 75 is moved out of engagement with the dynamic stop switch 59.

Simultaneously, the starting circuit is completed from conductors 306 and 302 via the vertical conductor 337, and through the now closed contact bar 364–15 of the energized reset relay 364 to the conductor 310 for energizing the table right relay 263. The circuit continues from conductor 310 to the now closed contact bar 296–19, to closed contact bar 295–19, conductor 330, normally closed contact bar 260–20, to the closed contact bar 50L, and thence to conductor 331, the relay 263, and conductor 332 to the conductor 306. With the relay 303 renergized, its associated contact bar 303–16 is closed, thereby conditioning a circuit for subsequently establishing a holding circuit to retain the table right relay 263 energized. At the same time, contact bar 303–24 is closed, conditioning a circuit for subsequently energizing the rapid traverse relay 257.

Reenergizing the relay 263 closes its associated contact bar 263–16 thereby completing a holding circuit for retaining the relay 263 energized. In addition, the associated contact bar 263–23 is closed thereby completing a circuit for energizing both the rapid traverse relays 350 and 257. Upon energization of the relay 350, contact bar 350–23 is closed, establishing a momentary overlapping holding circuit between conductors 240 and 376 to retain the rapid traverse relays 350 and 257 energized after the rapid right dog 73A moves out of engagement with the plunger switch 58 thereby moving the contact bar 58L to an open position and interrupting the circuit between conductors 356 and 357.

As the table resumes rightward rapid movement, the stop dog 75 is moved out of engagement with the plunger switch 59 thereby moving contact bar 59U to an open position interrupting the circuit to the relay 364, and simultaneously moving contact bar 59L to a closed position bridging the conductors 307 and 308. Again in this case with the deactuation of the plunger switch 59, it is important to note the delay in time interval. When the plunger switch 59 is deactuated, the contact bar 59L is moved into bridging engagement between conductors 307 and 308 prior to the opening of the contact bar 364–15. It will be noted that during this interval a parallel circuit is established between the conductors 337 and 310 for energizing the table right relay 263. This interval of completed, parallel circuitry is due to the fact that the time interval for the relay 364 to mechanically open the contact bar 364–15 upon its deenergization is greater than the time interval for the contact bar 59L to move from its open position to its closed position; the contact bar 59U moving to an open position as the contact bar 59L moves to its closed position. Thus, with the electrical circuit so established as to energize the table right relay 263 the rapid traverse relays 350 and 257, as well as the required clutch solenoids, the worktable 42 will continue to move rightwardly at rapid rate, as hereinbefore described, from its prior dynamic stopped condition.

Referring again to FIG. 7, it will now be assumed that the worktable 42 is moving leftwardly into a dynamic center stopped position thereby completing the table right portion of the automatic split cycle illustrated in FIGS. 7 and 7A. As the worktable 42 moves to the dynamic center stopped position, the rapid right dog 73A will actuate the plunger switch 58, but, as hereinbefore described, it will have no effect on the directionally sensitive control system; the "directional arrow" pointing in the opposite direction of worktable movement. Shortly thereafter, the stop dog 75 will engage the plunger switch 59 thereby deenergizing the table left relay 260, the rapid traverse relays 350 and 257, and the table run relay 303, as well as energizing the reset relay 364. With the control circuit so conditioned, worktable movement may be restarted in either leftward or rightward direction by depressing one or another of the pushbuttons 50 or 52.

Assume now that from the dynamic center stop position, further leftward movement of the worktable is desired. To effect leftward movement, the table left push button 50 is depressed, placing its associated contact bar 50U in bridging engagement between conductors 392 and 393, thereby completing a circuit for the energization of table run relay 303 and the table left relay 260. It will be apparent that actuation of these relays will energize the required clutch solenoids for effecting continued continued leftward movement of the worktable. With these conditions existing, the table will move leftwardly at feed rate in the absence of a rapid left dog, as is the condition shown in FIG. 7. The overlapping restarting circuit is again effected via contact bar 364-15 of energized reset relay 364, and subsequently via contact bar 59L after it has returned to its normally closed position.

A novel feature of the applicants' invention disclosed herein is the fact that worktable movement can be reinitiated in either a rightward or leftward direction of movement from a dynamic center stop position, FIG. 7, for split-cycle automatic operation irrespective of the prior direction of movement of the worktable before moving into the dynamic center stop position. In other words, if the table was moving leftwardly as the stop dog 75 actuated the plunger switch 59, immediate rightward movement could be initiated by depressing the table right push button 52. The stop dog 75 stops worktable movement by actuating switch 59 irrespective of whether the table is moving leftwardly or rightwardly. Actuating switch 59 conditions the electrical control circuit for subsequent worktable movement in either direction, which can then be initiated by depressing either the table left push button 50 or the table right push button 52.

The electrical circuit of the applicants' invention disclosed herein is provided with several additional novel features. One of these features precludes overriding the stop, reverse, and end limit dogs when operating in automatic mode, by maintaining one or another of the push button switches 50 or 52 depressed. For example, assume the worktable 42 is moving leftwardly at rapid rate with the dynamic center stop dog 75, FIG. 7, about to engage the plunger switch 59. Assume further, that the operator depresses the push button switch 50 attempting to override the center stop dog 75. As the dog 75 engages the plunger switch 59, the contact bar 59L is opened interrupting the circuit to the table left relay 260. Since the operator is depressing the push button switch 50, the contact bar 50U is completing a circuit maintaining the relay 303 energized. With the relay 303 energized, the contact bar 303-12 will be in the open position interrupting a circuit for the energization of the relay 364. By precluding the energization of the relay 364, the contact bar 364-15 remains in the open position interrupting the circuit for energization of the table left relay 260; the contact bar 59L also being in the open position at this time due to the actuation of the plunger switch 59 by the dog 75. With these conditions existing, in order for the operator to reinitiate leftward movement of the worktable, the push button switch 50 must be released thereby interrupting the circuit energizing the table relay 303 and simultaneously closing the associated contact bar 303-12. Upon closure of the contact bar 303-12, a circuit is completed for the energization of the relay 364 which closes its associated contact bar 364-15 conditioning a circuit for the subsequent energization of the table left relay 260. Depressing the push button switch 50 now again closes the contact bar 50U completing a circuit via the now closed contact bar 364-15 for the energization of the table left relay 260. It will be apparent that the identical conditions will result when attempting to override the stop dog 75 by depressing the push button switch 52.

It will now be assumed that the worktable 42 is moving leftwardly at feed rate in automatic cycle, FIG. 6, and that the operator attempts to override the reverse dog 63 by depressing the table left push button switch 50 prior to the dog 63 engaging the plunger switches 56 and 55 for the reverse function. Actuation of the plunger switch 56 interrupts the circuit, deenergizing the relay 295, in line 9, moving the contact bar 295-14 to the open position interrupting a parallel circuit now energizing the table left relay 260. Upon actuation of the plunger switch 55 by the dog 63, the contact bar 55U is moved to the open position interrupting the other parallel circuit for energizing the table left relay 260. Therefore, although the push button switch 50 is depressed completing a parallel energizing circuit between the conductors 240 and 337, the circuit to the table left relay 260 remains interrupted precluding its continued energization.

Likewise, when the worktable 42 is moving rightwardly, the reverse dog 68 cannot be overridden by maintaining the push button switch 52 depressed. In this case the reverse dog 68, FIG. 6, first actuates the plunger switch 57 deenergizing the relay 296 in line 10 which opens its associated contact bar 296-19. Shortly thereafter, the dog 68 actuates the plunger switch 58 moving its associated contact bar 58U to an open position interrupting the second parallel circuit energizing the table right relay 263. Again, it will be apparent that depressing the push button switch 52 establishes a parallel energizing circuit but that the table right relay is precluded from being continuously energized by the open contact bars 58U and 296-19.

In describing another condition in automatic cycle of operation, assume that the worktable 42 is moving leftwardly at rapid rate and the table stop push button switch 51 is depressed, stopping table movement; and assume further that the table stops at a point where the feed left dog 70 actuates the plunger switch 56. To reinstate leftward movement, the push button switch 50 is depressed completing a circuit for the energization of the table left relay 260. Since the relay 295 is deenergized, the contact bar 295-14 is open, interrupting one of the parallel circuits for energizing the relay 260. Upon depressing the push button switch 50, the table left relay 260 is reenergized via the other parallel circuit through the now closed contact bar 55U.

To operate the machine in manual mode, instead of automatic mode of operation, the selector switch 33 in line 18 is rotated to the manual position, moving the associated contact bars 285 and 288, lines 17 and 22, to open position; and closing the associated contact bar 292, line 19, bridging the circuit between conductors 293 and 294. When operating in manual mode, self maintaining circuits are established for retaining either the table left relay 260 or the table right relay 263 energized. Therefore, once table movement is initiated in manual mode of operation, it will continue until stopped by depressing the table stop switch 51. Depressing either the push button switch 50 or the push button switch 52 initiates feed rate movement of the worktable 42 in the respective direction. To obtain rapid traverse rate of movement in manual mode, the push button switch 53 is depressed in conjunction with one or the other of the push button switches 50 and 52. Upon release of the push button switch 53, the worktable 42 will again resume feed rate movement, since no self maintaining circuit is established for retaining the rapid traverse relay 257 energized. Feed rate will then continue until the worktable is stopped; either by depressing the table stop switch 51, or by dog 75 actuating the plunger switch 59, or by either one or another of the limit dogs 76 and 80 actuating the plunger switch 59.

The right and left limit dogs are effective for terminating worktable movement, in either automatic or manual mode of operation to positively limit the range of movement. Although, the end limit stops each comprise two dogs only one dog is actually necessary to stop movement of the worktable. In either end limit, the plunger switch 59 is actuated by the dog 76 or 80 to stop worktable movement. The other dogs 77 and 81, respectively, provide an additional safety feature precluding continued movement in the same direction of travel from which the table was stopped. For example, during leftward movement of the worktable the end limit dogs 80 and 81 will engage the plunger switches 57 and 59, FIGS. 7 and 9, to stop further rightward movement of the worktable. Actuation of the plunger switch 59 stops movement of the worktable, as hereinbefore described. Actuation of the plunger switch 57 opens the associated contact bar 296–16 in a parallel circuit precluding energization of the table left relay 260. It will be noted that since the relays 364 and 295 are energized at this time, the associated contact bars 364–14 and 295–15 are also opened precluding energization of the relay 260. Thus, with these conditions existing, depressing the table left push button switch 50 will not move the table in a leftward direction. Therefore, the worktable can be moved only in a rightward direction at its predetermined rate, by momentarily depressing the table right push button switch 52.

Similarly, when the worktable engages the right end limit stop, the dog 77 actuates the plunger switch 56 to preclude further rightward movement when the push button switch 52 is depressed. With the relays 296 and 364 energized and the relay 295 deenergized, the respective associated contact bars 296–20, 364–18, and 295–19 are all in the open position precluding energization of the table right relay 263. Thus, the worktable can only be moved leftwardly at a given rate by momentarily depressing the table left push button switch 50. In the event that the selector switch 32 was positioned for manual mode operation, the end limit dogs would still be effective as hereinbefore described due to the fact that whenever the plunger switch 59 is actuated, the associated contact bar 364–16 is in the open position.

It will be noted that the adjustable dogs for a particular function, as rapid traverse dogs 73 and 72, are constructed identically and therefore are interchangeable with each other for effecting rapid rate of travel. Likewise, the feed rate dogs 70 and 71 are interchangeable with each other and so are the reverse dogs 63 and 68. In similar manner, the end limit dogs 76 and 77 and 80 and 81 are respectively interchangeable. In addition, the dogs are constructed in a manner to provide certain novel features in the operation of a milling machine. To this end, the rapid traverse dogs 73 and 72 are constructed in an L shape so that they can be combined with other dogs, as shown in FIGS. 6 and 7, to obtain a desired cycle of operation. As shown in FIG. 7, the rapid dog 73A is combined with the stop dog 75, thereby providing an immediate rapid traverse rate of worktable movement from a dynamic stopped condition when rightward movement is initiated. Similarly, other rapid traverse dogs 72 and 73 are combined with the reverse dogs 68 and 63 and positioned in proximity to the safety limit dogs 77 and 81, respectively, to provide immediate rapid rate displacement upon reversal of the worktable 42.

It will be noted that the safety limit dog 77 is provided with a groove or slot 86 thereby permitting the base of the reverse dog 68 to be positioned in operative relationship behind the dog 77. Likewise, safety limit dog 81 is provided with a groove or recess 87 permitting the base of the reverse dog 63 to slide behind its actuating face. Positioning the reverse dogs 63 and 68 in this manner permits utilization of the full length of travel of the worktable 42 for automatic cycle operation. In somewhat similar manner, the stop dog 75 is provided with a groove or recess 88 allowing it to be positioned over the base of the safety limit dog 76, and similarly over the base of the dog 80.

In manual mode of operation, i.e., with the selector switch 33 positioned in the "manual" position, the reverse, rapid, and feed dogs have no effect on the electrical control circuit; the end limits dogs 76 and 77, 80 and 81, and the stop dog 75 being the only dogs having an effect on the control circuit in "manual" mode of operation.

Another novel feature incorporated in the applicants' invention disclosed herein is a "crank safe" safety feature. In the event the worktable is manually cranked to a selected position, irrespective of whether the selector switch 33 is in "manual" or "automatic" mode position, actuation of one or another of the plunger switches 55 to 58, inclusive, will have no effect on the electrical circuit for reinstating table movement in either direction. Thus, the worktable can be moved manually by hand cranking without restarting worktable movement accidentally. To illustrate this condition, assume that the selector switch 33 is in the "automatic" position and that the table is moving rightwardly at rapid rate. Assume further, that the push button switch 51 is momentarily depressed, stopping worktable movement and simultaneously effecting energization of both the solenoids 250 and 251 producing a dynamic braking effect of the worktable 42. Applying a hand crank (not shown) to the exposed end of the screw 45, FIG. 1, will move the associated contact bar 253, line 38 in FIG. 10, of the table crank interlock switch to the open position effecting the deenergization of the clutch solenoids 250 and 251. With this condition existing, the directional clutches 130 and 131 producing the dynamic braking effect are released, and the screw 45 can now be rotated manually for moving the worktable to a selected position. Assume now that this selected position occurs at a point where the feed dog 70, FIG. 6, actuates the plunger switch 56. Upon removal of the hand crank from the screw 45, the contact bar of the table crank interlock switch 253 is moved to the closed position, effecting reenergization of the clutch solenoids 250 and 251 which again produce the dynamic braking effect, as hereinbefore described. Since the relays 303 and 260 remain deenergized during hand cranking, it will be apparent that the worktable will remain in the stopped condition. With the relay 303 deenergized, the contact bar 303–16 is in its normally open position interrupting the circuit from the conductor 240 to relays 303, 260 and 263. In this manner, contact bar 303–16 coacts with interlock switch 253 to provide a "crank safe" safety feature in the electrical control circuit. Thus, even though switch 253 reengages prior to complete removal of the crank from the square end of the screw 45, the open contact bar 303–16 prevents accidental restarting of the table under power. In other words, with the control circuit activated neither the table right relay 263 nor the table left relay 260 can be energized without first energizing the table "run" relay 303 which closes the contact bar 303–16. Therefore, to reinstate worktable movement, one or another of the push button switches 50 or 52 must be depressed to energize the table "run" relay 303 and the other proper relays for effecting the selected direction of movement. By further inspection of the circuit shown in FIG. 10, it will be apparent that similar conditions will exist if the worktable is cranked to a position where one or another of the various dogs actuate one or more of the plunger switches 55 to 59, inclusive. In all cases, table "run" relay 303 must be energized prior to the switches 55 to 59 inclusive having any controlling effect on table movement. It will be apparent that initial energization can be effected only by depressing one or another of the manually operable table start switches 50 or 52, lines 14 or 13, respectively.

From the foregoing detailed description of the invention disclosed herein, it will be apparent that there is provided a greatly improved automatic control system employing coded signal means for controlling power driven worktable movements or functions. To this end, one of four separate plunger switches is momentarily actuated to initiate the selected function during an existing movement. To insure proper directional control, two of the separate switches are operable in one direction, and the other two switches in the reverse direction. Likewise, individual pairs of the four separate switches are respectively and sequentially actuatable in code fashion to effect two reverse functions. Each pair of the code actuated switches are operative to initiate a selected direction of movement. A fifth direct acting switch is operable to stop table movement, irrespective of rate and direction, and irrespective of whether in "manual" or "automatic" mode of operation, and simultaneously, while actuated, conditions a circuit for subsequent restarting. Selective actuation of all the switches is effected by one or another of a plurality of coacting dogs adjustably secured to the table in a manner to actuate the appropriate switches for controlling an associated electrical control circuit for effecting the desired control of the power drive means. An additional novel improvement in this invention is the use of dogs of simplified construction coacting with plunger switches having plungers of different lengths, thereby producing a sequential or cam type actuation of the plunger switches. By the use of simplified dogs, plunger switches having different plunger lengths, and both coded and uncoded switches for the control functions of the worktable, full length of table travel is made usable.

Although the exemplary embodiment of the invention has been described in considerable detail in order to fully disclose a practical apparatus incorporating the invention, it is to be understood that the particular structure shown and described herein is illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine, a control apparatus for a bodily movable machine element to be positionally controlled; a plurality of signal control means carried by said machine and comprising a first signal means operatively connected to initiate displacement of said machine element at a feed rate in a first direction of movement; a second signal means operatively connected to initiate displacement of said machine element at a rapid rate in the first direction of movement; a third signal means operatively connected to initiate displacement of said machine element in a second direction of movement; a fourth signal means operatively connected to initiate displacement of said machine element at a rapid rate in the second direction of movement; a fifth signal means operatively connected to stop displacement of said machine element in any predetermined position; said first and second signal means being operatively connected in combination to initiate reversed movement of said machine element from the first direction of movement to the second direction of movement; said third and fourth signal means operatively connected in combination to initiate reversed movement of said machine element from the second direction of movement to the first direction of movement; a plurality of signal actuating means removably and selectively secured to said element in a manner to actuate said signal means individually in selected combination during movement of said element; circuit control means connected to be actuated by operation of said signal means and including manual starting means; and a variable speed reversibly operable power source connected to effect movement of said element in accordance with the operation of said circuit control means and said manual starting means.

2. In a machine tool provided with an automatic control system, a reciprocably movable member, carried by said machine tool, a plurality of signal transmitting means, having actuating plungers of different length carried by said machine tool, a plurality of actuating dogs carried by said movable member in a single plane and presenting angular cam faces in operative relationship to actuate one or another of said signal means, several of said signal means presenting actuating plungers operatively positioned in nearer proximity to the plane of movement of said dog than the remaining signal means, whereby a plurality of said signal means each having actuating plungers of different length and positioned in unequal operating proximity with respect to the plane of movement of one dog will be sequentially actuated by movement of said dog relative thereto.

3. In an electrical circuit for controlling direction and rate of a movable member by means of a plurality of electrical devices, a plurality of control devices connected in parallel, circuit interrupter means interconnected with said control devices for selective energization of one or another of said control devices, a plurality of solenoids connected in parallel circuitry apart from said control devices, said control circuits having a plurality of relays with corresponding contacts connected in said circuit establishing self maintaining holding circuits when selectively energized and having a plurality of relays with corresponding contacts interconnected with said solenoids to selectively energize one or another of said solenoids, one of said circuit interrupter means connected in series-parallel circuitry with first and second control devices selectively energizeable to control direction of movement of said member, said first control device operatively connected only when said member is moving in a first direction of movement, said second control device being operatively connected only when said member is moving in a second direction of movement, and a plurality of manually operated switches operatively interconnected to energize and deenergize said circuit whereby there is provided an automatic direction sensitive electrical control system with a single uncoded circuit interrupter connected to terminate movement of said member irrespective of direction of movement.

4. In a machine control apparatus comprising a machine, an element movably carried by said machine and adapted to be directionally controlled at selected rate, a first signal means operatively connected to displace said machine element at a feed rate in a first direction of movement, a second signal means operatively connected to displace said machine element at a rapid rate in the first direction of movement, a third signal means operatively connected to displace said machine element in a second direction of movement, a fourth signal means operatively connected to displace said machine element at a rapid rate in the second direction of movement, a fifth signal means operatively connected to terminate displacement of said machine element in any predetermined position irrespective of the direction of movement, and a plurality of signal actuating means adjustably secured to said element in a manner to actuate said signal means selectively during movement of said element for regulating its movement.

5. In a machine tool, a frame, a rectilinearly movable work support carried by said frame, a power driven transmission operably connected to effect displacement of said work support, a pair of directional clutches operably connected to said transmission for providing bidirectional movement of said work support, a plurality of plunger switches secured to said frame adjacent said work support, a plurality of dogs adjustably secured to said work support in a manner to selectively engage said plunger switches, several of said plunger switches having actuating plungers spaced closer to said work support than the actuating plungers of other said switches to produce slightly earlier operation when engaged by the same dog whenever a plurality of dogs are secured to said work support in cooperating relationship with said switches, an electrical control circuit operatively connected to said plunger switches to be activated by said switches for actuating said transmission to effect selective displacement of said work support, and an electrical master control station interconnected with said control circuit and said plunger switches and operative to selectively neutralize control signals from said plunger switches whereby an automatic control system for cyclic operation of said work support is subject to manual control.

6. In an automatic control system for machine tools, a base portion; a power driven reciprocably movable work support carried by said base portion; a pair of oppositely rotating electrically actuated motion interrupters operably connected to said work support; an electrically adjustable rate changer including a motor operably connected with said motion interrupters to drive said work support; an electrical control circuit connected to said motion interrupters, said rate changer and motor; a source of electrical power connected to said control circuit; a plurality of adjustable dogs secured to said work support; a plurality of switches provided with plungers biased in one direction, said switches being so secured to said base portion in operative proximity to said work support as to be selectively engaged by said dogs; said dogs being constructed in a manner to be adjustably secured to said work support to permit utilization of the full length of travel thereof in operably and selectively engaging the plungers of said switches; said switches being operable singularly for respectively effecting feed rate and rapid rate movements of said work support in opposite directions and for effecting a dynamic stop function at any selected position; said switches being selectively actuated in predetermined combinations to respectively effect reversing movements of said work support in either direction; and a manually operable electrical master control station interconnected with said control circuit and operable to effect cancellation of selected signals from said switches and have said control circuit respond to signals from said master control station.

7. In a machine tool for either continuous or intermittent automatic cycling operation, a frame, a power driven reciprocably movable work support, a pair of selectively actuatable electrically operated directional clutches respectively driven in opposite directions of rotation and being selectively engageable for driving said work support in one direction or the other, a plurality of dog actuated switches secured to to said frame in operative proximity to said work support, several of said switches being positioned closer to said work support than the remainder of said switches, a plurality of dogs secured to one side of said work support in a manner to selectively engage said switches, said dogs being constructed so as to be positionable on said work support in a manner to utilize the full length of travel of said work support, a rate changer including a motor connected to drive said directional clutches, a source of electrical power, an electrical control circuit energized by said source of power and operably responsive to dog actuation of said switches for controlling displacement of said work support, and a manually operated master control station comprising a plurality of electrical master signal interrupters operably connected to said control circuit in a manner that signals from said master control station exert selected control in lieu of the control signals from said dog actuated switches.

8. In a machine tool, a frame, a relatively movable member carried by said frame for rectilinear movement, a plurality of rate and directional control switches and a single stop switch operatively disposed adjacent to said movable member, a plurality of rate and directional control switch actuating dogs secured to said movable member in a manner to selectively engage said rate and directional control switches in predetermined sequence, a single stop dog secured to said support for actuating said single stop switch to stop movement of said member in either direction, a control circuit operatively interconnected with said switches, a plurality of directional clutches operatively connected to selectively drive said movable member in either direction, a rate changer including a source of power operatively connected with said directional clutches, said control circuit including selectively operative means and being responsive to said switches for actuating said rate changer and said directional clutches to control the direction and rate of movement of said member, and a plurality of manually operated master switches interconnected with said control circuit in a manner to override signals from said switches, whereby said worktable is automatically operable for either continuous or intermittent cyclic operation.

9. In a control system for a machine tool, a frame, a relatively movable member carried by said frame, a plurality of switch actuating dogs adjustably secured to said member, a plurality of coded control switches carried by said frame and selectively actuated by said dogs either singly or in selected coded combinations, one of said control switches being a stop switch individually capable of stopping member movement, a stop dog releasably secured to said member for operating said stop switch, said stop dog being so configured as to be selectively secured to said member in overlapping relationship with one or another of said other dogs for simultaneously actuating said stop switch and a selected one of said other switches, circuit control means including a reversible variable speed power source operatively connected to control member movement according to switch actuation by said dogs, said circuit control means being conditioned by simultaneous operation of said stop switch and one of said other switches for restarting movement of said member at one of two preselected rates, and manual means connected to actuate said circuit control means for starting member movement.

10. In a machine tool provided with a reciprocable work support, a pair of control switches carried by said machine and presenting axially movable actuating plungers of different length disposed in parallelism and extending toward said work support in vertical alignment transverse to the plane of movement of said work support, one of said switches being actuatable to change the rate of member movement, separate dogs releasably secured to said work support and respectively presenting angular cam faces in the same plane, said separate dogs being operable to actuate said switches individually and selectively for changing the rate of travel of said member when moving in one direction, a reverse dog presenting an angular cam face identical to the angular faces of said separate dogs, said reverse dog being operative to effect sequential coded operation of both said switches for reversing the direction of movement of said support, control circuit means responsive to actuation of said switches, and a variable speed power source reversibly connected to move said support in response to operation of said circuit control means by said switches.

11. In a machine tool control system, a frame, a support slidably carried by said frame for rectilinear movement in either direction, a stop switch carried by said frame and provided with a plunger extending toward said movable support, a stop dog releasably secured to said support for actuating said stop switch to stop support movement in either direction, a plurality of first rate change switches carried by said frame in vertically spaced alignment relative to said stop switch and being individually actuatable to change the rate of support movement when said support is moving in one direction, a plurality of second rate change switches carried by said frame in vertically spaced relationship to said stop switch and being operative to change the rate of travel of said support when it is moving in the opposite direction, a plurality of rate change dogs releasably secured to said support for respectively and selectively actuating a corresponding one of said rate change switches for changing the rate of support movement whenever the support is moving in an appropriate direction, said rate change dogs and said stop dog being configured in such a manner that said stop dog and a selected one of said rate change dogs can be secured to said support for effecting simultaneous actuation of said stop switch and a preselected one of said rate change switches, control circuit means operatively interconnected to be actuated by operation of said switches to change the rate of movement during support movement, said control circuit means connected to be preset by simultaneous coded operation of said stop switch and said preselected rate change switch for restarting table movement from a dynamic stop position at a rate determined by the coded setting, a variable speed power source connected to be actuated by said control circuit means for moving said support at a rate determined by actuation of said switches, and manual control means connected to activate said control circuit means for starting movement of said support.

12. In a machine tool having a frame, a work support movably carried by said frame for rectilinear movement, a variable speed power source reversibly connected to drive said support in either direction at a selected rate, control circuit means including presettable circuit control means and a source of power connected to be so activated as to control said power source for driving said support at a selected rate and direction of movement, a plurality of rate change switches and a stop switch carried by said frame in spaced relation to said movable work support and being operatively interconnected in said circuit control means, a plurality of rate change dogs and a stop dog releasably secured to said work support in position to effect predetermined actuation of said switches during movement of said work support, said rate change dogs and said stop dog being so arranged as to be releasably secured to said support in a manner to effect simultaneous coded actuation of said stop switch and a preselected one of said rate change switches, said stop switch and said preselected rate change switch being code actuated to activate said circuit control means for dynamically stopping movement of said work support and presetting said control means for resuming support movement in accordance with the coded switch actuation, and manual means connected to activate said control circuit means for initiating movement of said work support.

13. In a control apparatus for regulating the operation of a movable member of a machine; a source of power connected to actuate said member in two directions of movement and at different rates of travel; first rate control means actuatable by the movement of said member at a preselected position for changing the rate of travel of said member in a first direction of movement; means connected to render said first rate control means inoperable when said member is moving in a second direction; second rate control means actuatable by the movement of said member at a preselected position for changing the rate of travel of said member in the second direction; means connected to render said second rate control means inoperable when said member is moving in the second direction; and separate stop means actuatable by the movement of said member in either direction for stopping the movement of said member at a preselected position and in a condition for restarting movement of said member at one rate, said separate stop means being presettable in combination with one of said rate control means for stopping the movement of said member at a preselected position and to establish a condition for restarting movement of said member at a different rate.

14. In a control apparatus for controlling the operation of a movable member of a machine; a source of power connected to actuate said member in two directions of movement and at different rates of travel; first rate control means actuatable by the movement of said member in a first direction for changing the rate of travel of said member; second rate control means actuatable by the movement of said member in a second direction for changing the rate of travel of said member; and separate stop means actuatable in preset coded combination with a selected one of said rate control means during movement of said member in either direction for both stopping the movement of said member at a preselected position and for establishing conditions for restarting movement of said member at a rate determined by whichever of said rate control means that had been actuated during stopping.

References Cited by the Examiner
UNITED STATES PATENTS 2,677,285 5/54 Volk.
2,869,390 1/59 Leifer.
2,905,015 9/59 Zajac et al.

DON A. WAITE, *Primary Examiner.*